(12) United States Patent
Taylor et al.

(10) Patent No.: US 8,506,685 B2
(45) Date of Patent: Aug. 13, 2013

(54) HIGH PRESSURE LIQUID DEGASSING MEMBRANE CONTACTORS AND METHODS OF MANUFACTURING AND USE

(75) Inventors: Gareth P. Taylor, Indian Trail, NC (US); Amitava Sengupta, Charlotte, NC (US)

(73) Assignee: Celgard LLC, Charlotte, NC (US)

( * ) Notice: Subject to any disclaimer, the term of this patent is extended or adjusted under 35 U.S.C. 154(b) by 293 days.

(21) Appl. No.: 12/857,199

(22) Filed: Aug. 16, 2010

(65) Prior Publication Data

US 2011/0036240 A1 Feb. 17, 2011

Related U.S. Application Data

(60) Provisional application No. 61/234,465, filed on Aug. 17, 2009.

(51) Int. Cl.
*B01D 53/22* (2006.01)
*B01D 19/00* (2006.01)
*B01D 69/08* (2006.01)

(52) U.S. Cl.
USPC .................................. 96/6; 96/8; 96/9; 95/46

(58) Field of Classification Search
USPC ............ 96/4, 6, 8, 10, 9; 95/45, 46; 210/640
See application file for complete search history.

(56) References Cited

U.S. PATENT DOCUMENTS

| 5,264,171 | A | 11/1993 | Prasad et al. |
| 5,352,361 | A * | 10/1994 | Prasad et al. ............. 210/321.81 |
| 5,938,922 | A | 8/1999 | Fulk, Jr. et al. |
| 6,860,922 | B2 * | 3/2005 | Watari et al. ......................... 96/6 |
| 2004/0000232 | A1 | 1/2004 | van Home et al. |
| 2005/0218064 | A1 * | 10/2005 | Sengupta et al. .................. 96/8 |
| 2009/0032446 | A1 * | 2/2009 | Wiemers et al. ................ 210/85 |

\* cited by examiner

*Primary Examiner* — Jason M Greene
(74) *Attorney, Agent, or Firm* — Hammer & Associates, P.C.

(57) ABSTRACT

In accordance with at least selected embodiments of the present invention, an improved liquid degassing membrane contactor or module includes a high pressure housing and at least one degassing cartridge therein. It may be preferred that the high pressure housing is a standard, ASME certified, reverse osmosis (RO) or water purification pressure housing or vessel (made of, for example, polypropylene, polycarbonate, stainless steel, corrosion resistant filament wound fiberglass reinforced epoxy tubing, with pressure ratings of, for example, 150, 250, 300, 400, or 600 psi, and with, for example 4 or 6 ports, and an end cap at each end) and that the degassing cartridge is a self-contained, hollow-fiber membrane cartridge adapted to fit in the RO high pressure housing.

17 Claims, 25 Drawing Sheets

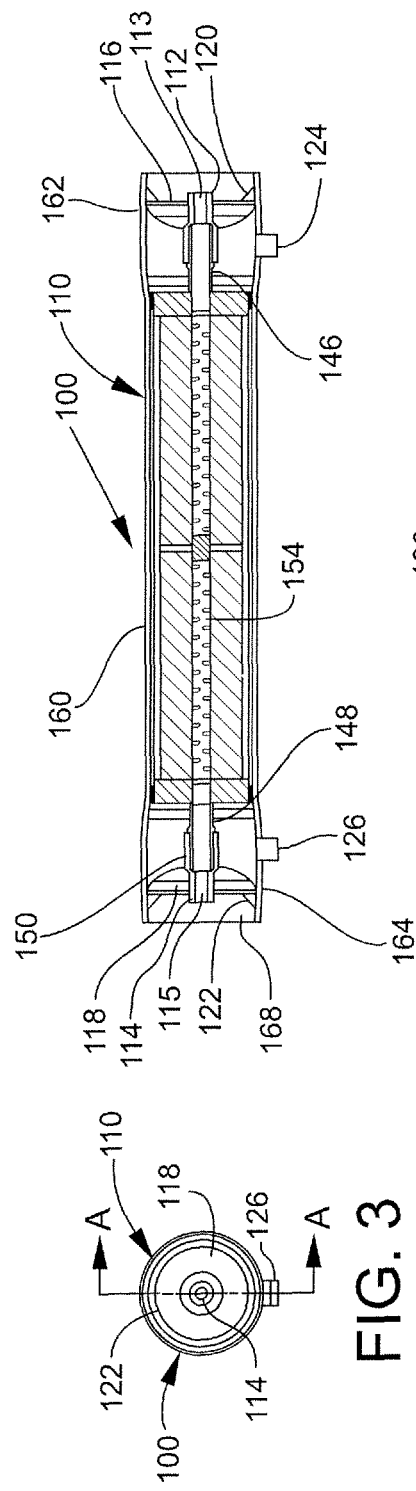
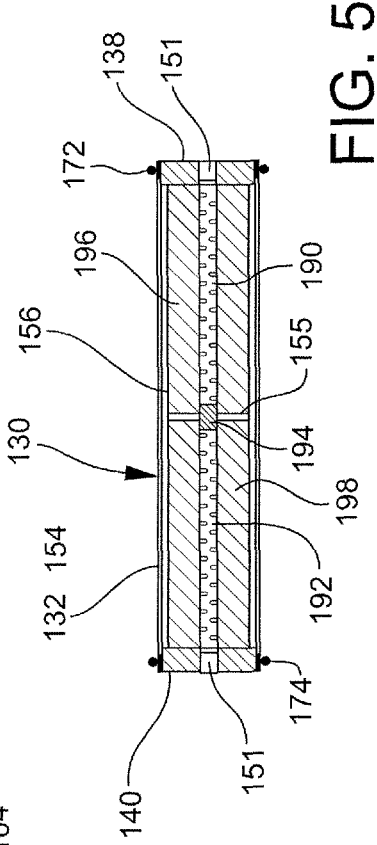
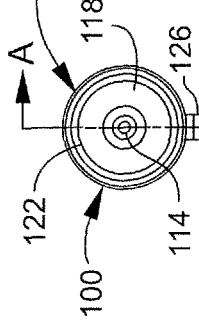
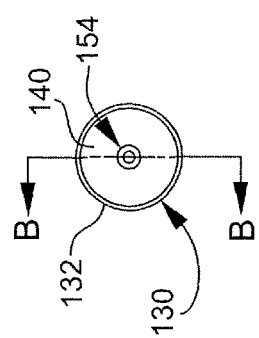

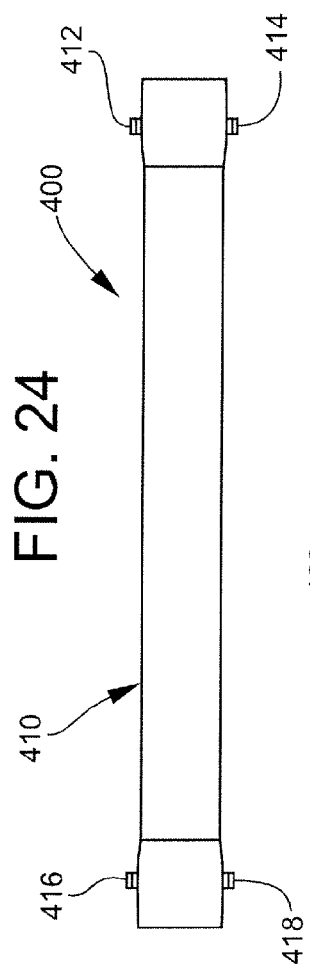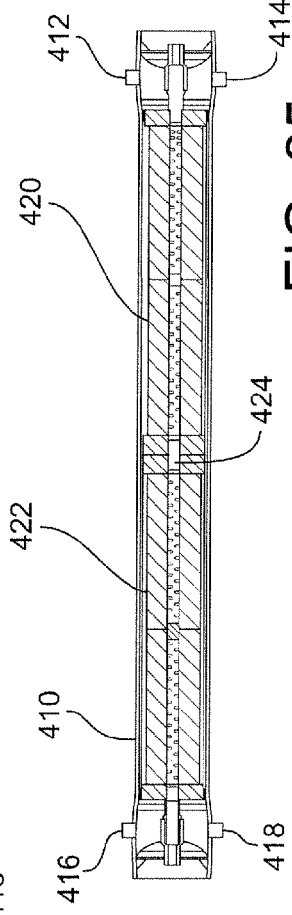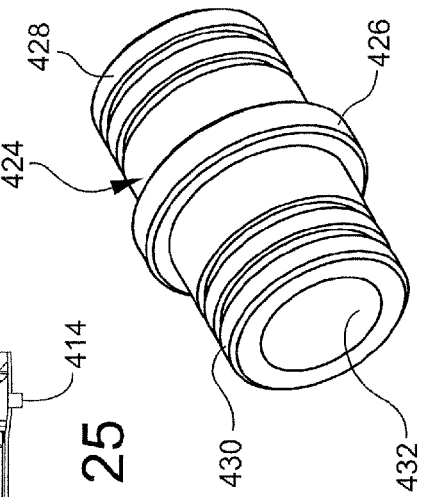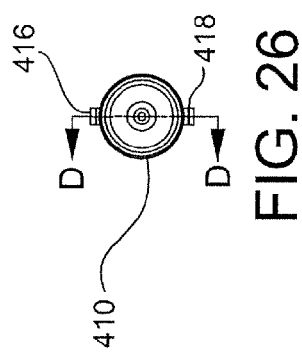

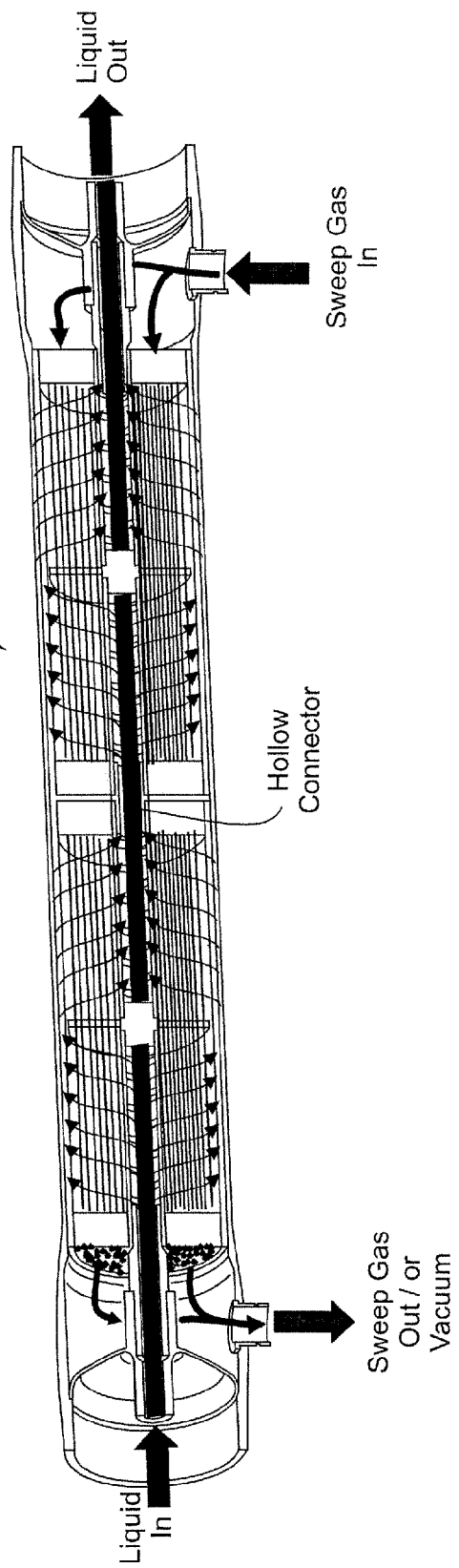

~ 130,000 b/d Degas Skid

56 Liqui-Cel 8x80" Contactors
56 parallel trains x 1 contactor(s) in series
Residual O2 <20 ppb <u>WEIGHTS</u>
Contactors (56* 195 lbs (weight contactor + seawater)    10,900 lbs.
Inlet and Outlet Water Manifolds full
   [2*{(96 lbs./ft * 18 ft) + (18 ft * (11.25)} * .34)].     5,000 lbs.
Vacuum Pump (420 lbs * 2 pumps)                             840 lbs.
Estimate for steel frame, pipe and valves                 5,228 lbs.

TOTAL   ~21,988 lbs.

FIG. 35

HIGH PRESSURE LIQUID DEGASSING MEMBRANE CONTACTORS AND METHODS OF MANUFACTURING AND USE

CROSS-REFERENCE TO RELATED APPLICATION

This application claims priority to and the benefit of provisional U.S. application Ser. No. 61/234,465, filed on Aug. 17, 2009.

FIELD OF INVENTION

The instant application relates to membrane contactors and their methods of manufacture and use. In at least selected embodiments, the present invention is directed to high pressure liquid degassing membrane contactors and/or their methods of manufacture and/or use. In at least certain embodiments, the present invention is directed to degassing a high pressure liquid having entrained or dissolved gases with a hollow fiber membrane contactor. In at least particular possibly preferred embodiments, the contactor has a high pressure vessel or housing enclosing at least one membrane cartridge including a perforated core, a plurality of hollow fiber membranes, a tube sheet affixing each end of the hollow fibers, and a shell or casing.

BACKGROUND OF THE INVENTION

A membrane contactor may be used for many purposes, including but not limited to, removing entrained gases from liquids, debubbling liquids, filtering liquids, and adding a gas to a liquid. Membrane contactors are known to be used in many different applications, for example, a membrane contactor may be used in removing entrained gases from inks used in printing.

Membrane contactors may also provide a means of accomplishing gas/liquid, and liquid/liquid (which can encompass liquid/dissolved solid) separations. Membrane contactors typically are used to bring two immiscible fluid phases—for example, a first liquid and a second liquid, or a gas and a liquid—into contact with one another to effect separation and/or transfer of one or more components from one fluid to the other.

A hollow fiber membrane contactor typically includes a bundle of microporous hollow fibers, and a rigid shell or housing enclosing the fiber bundle. The shell may be provided with four fluid ports: an inlet for introducing the first fluid, an outlet for discharging the first fluid, an inlet for introducing the second fluid, and an outlet for discharging the second fluid. The hollow fibers may be potted on both ends, within the housing, to form polymeric tube sheets with the fiber bores opening on each end into common first and second end cap portions of the shell. In a "tube-side" or "lumen-side" contactor, the first end cap may contain the inlet for the first fluid, which is designated the "tube-side" or "lumen-side" fluid because it is the fluid that passes through the internal lumens of the fibers. The second end cap contains the outlet for discharging the lumen-side fluid. The second fluid, designated the "shell-side" fluid, typically enters and exits the housing through inlet and outlet ports arranged between the tube sheets, whereby the shell-side fluid contacts the external surfaces of the fibers. The shell-side fluid flows through the interstices between fibers of the fiber bundle, and may be directed to flow parallel or perpendicular to the fiber length. As an example, U.S. Pat. No. 5,352,361 to Prasad, et al., incorporated by reference herein in its entirety, may assist in a background understanding of fluid contact across hollow fiber membranes within a shell.

In a "shell-side" contactor, the contactor may include a central core which passes through the end caps and has a first end serving as the inlet for the first fluid, which is designated the "shell-side" fluid because it is the fluid that passes over the exterior or shell of the hollow fibers. The first end cap may contain the inlet for the second fluid, which is designated the "tube-side" or "lumen-side" fluid because it is the fluid that passes through the internal lumens of the fibers. The second end cap contains the outlet for discharging the lumen-side fluid. The first fluid, designated the "shell-side" fluid, typically enters and exits the housing through inlet and outlet ports (open ends) of the perforated core, and typically exits and re-enters the perforations in the core between the tube sheets whereby the shell-side fluid contacts the external surfaces of the fibers. The shell-side fluid flows through the interstices between fibers of the fiber bundle, and may be directed to flow parallel or perpendicular to the fiber length.

Because the tube sheets separate the lumen-side fluid from the shell-side fluid, the lumen-side fluid does not mix with the shell-side fluid, and the only transfer between the lumen-side fluid and the shell-side fluid occurs through the walls of the hollow fibers. The fine pores in the fiber wall are normally filled with a stationary layer of one of the two fluids, the other fluid being excluded from the pores due to surface tension and/or pressure differential effects. Mass transfer and separation are usually caused by diffusion, which is driven by the difference in concentration of the transferring species between the two phases. Typically, no convective or bulk flow occurs across the membrane.

In the case of gas/liquid separations, membrane contactors are typically fabricated with hydrophobic hollow fiber microporous membranes. Since the membranes are hydrophobic and have very small pores, liquid will not easily pass through the pores. The membranes act as an inert support that brings the liquid and gas phases into direct contact, without dispersion. The mass transfer between the two phases is governed by the difference in partial pressure of the gas species being transferred.

For liquid systems, the liquid/liquid interface at each pore is typically immobilized by the appropriate selection of membrane and liquid phase pressures. In this case, the membrane also acts as an inert support to facilitate direct contacting of two immiscible phases without mixing.

Such known membrane contactors can be utilized for a variety of applications, including the separation of a component from a fluid or transferring a component of one fluid to another. For example, a membrane contactor can be used in removal of contaminants from an effluent stream. In many industrial processes, a contaminated effluent stream is generated as a by-product. In view of environmental concerns, and/or efforts to improve process efficiency, it is often desirable to remove one or more contaminants from the effluent stream so that the contaminant does not pollute the environment, negatively effect equipment, or so that it may be recycled. Existing industrial processes frequently must be upgraded to reduce environmental emissions and/or increase efficiency. Therefore, a need often arises for a process and system that can be economically retrofit to an existing plant to reduce emissions, protect equipment, recycle, or improve efficiency.

Several factors are important in the design of membrane contactors, including separation characteristics, cost, pressure drop, weight, and efficiency. The pressure drop across a contactor should be low to reduce the need for more expensive high pressure equipment. Low pressure drop is of particular importance in retrofit projects where a membrane contactor is to be added at the discharge point of an effluent process stream, as the process pressure at this point is typically at or near atmospheric pressure. High efficiency of mass transfer is desirable for reducing the size of the contactor. Low weight is desirable for decreasing installation and maintenance costs, and is of particular importance in offshore applications. At least certain existing membrane contactors have been found less than fully satisfactory in meeting these goals, for particular applications, for extreme conditions, or the like. For example, the shell portion of typical membrane contactors adds considerably to their weight and expense. Shell-type contactors also typically must operate at elevated pressures. Accordingly, a need exists for an improved membrane contactor having improved characteristics over known membrane contactors, for use in particular applications, for use in extreme conditions, or the like. It is to the provision of a microporous hollow fiber membrane device and/or method meeting these and/or other needs that at least selected embodiments of the present invention may be directed.

Baffled membrane contactors capable of separating fluids are known, for example, see U.S. Pat. Nos. 5,264,171; 5,352,361; and 5,938,922, each of which is incorporated herein by reference in its entirety. At least certain of such contactors may include a perforated center tube, a plurality of hollow fibers surrounding the tube, tube sheets affixing the ends of the hollow fibers, a baffle located between the tube sheets, and a shell surrounding the tube, fibers, tube sheets, and baffle. Other than as disclosed in the U.S. Pat. No. 5,938,922 patent, the fibers are usually open at the baffle so that there is fluid communication through the hollow fiber lumen from one tube sheet to the other. The U.S. Pat. No. 5,938,922 discloses having the fibers closed at the baffle to prevent fluid communication through the hollow fiber lumen near the midpoint of the fibers between the tube sheets.

Such contactors capable of separating fluids, for example, dissolved gas from water, have numerous industrial applications. Those applications include: rust prevention systems for boilers or power plant turbines; rust prevention systems for drinking water, cooling water, or hot water pipe lines; ultra-pure water sources for the electronics industry (e.g., rinsing semiconductor wafers during manufacture); ultrasonic cleaning processes; water sources for food processing; and the like.

Two of the foregoing applications are of particular interest. They are rust prevention in water pipe lines and ultra-pure water sources for the electronics industry. In each application, the removal of dissolved oxygen from water is extremely important. In rust prevention in water pipe lines, the oxygen reacts with dissolved iron or iron from the pipe line to form rust that may precipitate. In potable water, the rust precipitate is unattractive and causes staining; and in pipe lines, it can cause occlusion of the pipe. In ultra-pure water for the electronics industry, water is used to rinse semiconductor wafers during manufacture. Dissolved oxygen in the rinse water can etch the surface of the wafer and destroy it; it can also coat the wafer surface and prevent effective rinsing. Accordingly, the removal of dissolved gasses from water is extremely important.

Therefore, there is a need to develop new or improved contactors and systems for degassing of liquids.

Also, current designs of membrane contactors are effective for some applications, but may have certain issues or limitations related to, for example, the degassing of high flow rate liquids and/or high pressure liquids, such as seawater at about 50 gpm or more and/or about 300 psi, high pressure ratings, ASME code ratings, customer familiarity and acceptance, high cost, high weight, use of metal or other corrosive materials, modularity, replaceable self contained cartridges, porting options, module size, module array size, high pressure cartridges, excessively long fibers, liquid flow rates, gas concentration variation, do not allow for commercial production, and/or the like.

High flow rate, high pressure membrane contactors have long been the subject of interest to membrane developers. For example, selected gas transfer membrane contactors developed and manufactured by the Liqui-Cel business of Membrana-Charlotte a division of Celgard, LLC of Charlotte, N.C. can handle high flow rate (up to 400 gpm) and high pressure (up to 100 psi) liquids.

With the exception of the recent use of, for example, Liqui-Cel® Extra-Flow™ membrane contactor systems, most large scale industrial degasification systems still utilize very large vacuum towers to degasify water, seawater, and the like. For example, power plants and offshore oil rigs typically use large vacuum towers (30 feet tall or more) to degass water, process water, storage tank water, seawater, salt water, or the like.

A new or improved liquid degassing membrane contactor would allow for relatively small, modular, degassing modules to be used in industrial processes, at power plants, on offshore oil rigs or drilling platforms, to replace or augment vacuum towers, to provide the benefits of modularity and replaceable cartridges, and/or the like. Accordingly, there is a need for a new or an improved liquid degassing membrane contactor and methods of manufacture and/or use thereof, a new or improved high pressure liquid degassing membrane contactor and/or methods of manufacture and/or use thereof, a new or improved high pressure liquid degassing system, and/or the like.

SUMMARY OF THE INVENTION

The instant application relates to membrane contactors and their methods of manufacture and use. In at least selected embodiments, the present invention is directed to high pressure liquid degassing membrane contactors and/or their methods of manufacture and/or use. In at least certain embodiments, the present invention is directed to degassing a high pressure liquid having one or more entrained or dissolved gases with a hollow fiber membrane contactor. Preferably, the contactor has a high pressure vessel or housing enclosing at least one membrane cartridge including a perforated core, a plurality of hollow fiber membranes, a tube sheet affixing each end of the hollow fibers, and a shell or casing. More preferably, lumens of the hollow fibers are in fluid communication with a sweep gas (a strip gas), a vacuum, or both, and the liquid to be degassed (or debubbled) enters the contactor via an open end of the perforated core and radially exits through the core perforations, crosses over the exterior of the hollow fibers (the shell side or shellside), optionally passes over at least one baffle and crosses over the exterior of another portion of the hollow fibers, returns to the core through the perforations, and exits the contactor with less dissolved or entrained gas. The entrained or dissolved gas diffuses or passes from the liquid across the hollow fiber membrane and into the lumen.

In at least selected embodiments, the present invention is directed to high pressure liquid degassing membrane contactors having high pressure vessels or housings that are typically used in reverse osmosis (RO) equipment (not in liquid degassing membrane contactors). Such RO high pressure vessels or housings may need to be modified or retrofitted to have the permeate or gas ports function correctly under vacuum or reduced pressure conditions. Most RO high pressure vessels or housings have the ports designed to work under pressure but not under vacuum.

In at least certain embodiments, the present invention is directed to degassing a liquid having a dissolved or entrained gas or gases with a membrane contactor including one or more hollow fiber membrane cartridges adapted to fit inside a high pressure vessel or housing. Preferably, the contactor has a high pressure vessel or housing enclosing at least one membrane cartridge including a perforated core, a plurality of hollow fiber membranes, a tube sheet affixing each end of said hollow fibers, an optional baffle, and a shell. More preferably, the hollow fiber lumens are in fluid communication with a sweep gas (or strip gas), a vacuum, or both, and the liquid to be degassed (or debubbled) enters the contactor via an open end of the perforated core and radially exits the core perforations, crosses over the exterior of the membranes within the shell, optionally passes over a baffle and crosses over the exterior of other portions of the membranes within the shell, re-enters the core through other perforations, and exits the contactor with less entrained or dissolved gas. As such, the contactor is a shell-side liquid contactor and the dissolved or entrained gas diffuses from the liquid across the membrane and into the lumen (and out through a side or end gas or vacuum port).

In accordance with at least selected embodiments of the present invention, the present new or improved membrane contactors address the drawbacks of prior contactors, are effective for some applications, are adapted for the degassing of high flow rate liquids and/or high pressure liquids, such as seawater at about 50 gpm or more and/or about 300 psi, have high pressure ratings, have ASME code ratings, will have immediate customer familiarity and acceptance, are relatively lower cost, are relatively lower weight, do not use metal or other corrosive materials, do not use PVC, are modular, have replaceable self contained cartridges, offer porting options, have module size, have module array size, have high pressure cartridges, do not have excessively long fibers, accommodate high liquid flow rates, eliminate or reduce gas concentration variations, allow for commercial production, and/or the like.

High flow rate, high pressure membrane contactors have long been the subject of interest to membrane developers. For example, selected gas transfer membrane contactors developed and manufactured by the Liqui-Cel business of Membrana-Charlotte a division of Celgard, LLC of Charlotte, N.C. can handle high flow rate (up to 400 gpm) and high pressure (up to 100 psi) liquids.

With the exception of the recent use of, for example, Liqui-Cel® Extra-Flow™ membrane contactor systems, most large scale industrial degasification systems still utilize very large vacuum towers to degasify water, seawater, and the like. For example, power plants and offshore oil rigs typically use large, metal vacuum towers (30 feet tall or more) to degas water, process water, storage tank water, seawater, salt water, and/or the like.

In accordance with at least certain embodiments of the present invention, a new or improved liquid degassing membrane contactor allows for relatively small, modular, degassing modules to be used in industrial processes, at power plants, on offshore oil rigs or drilling platforms, to replace or augment vacuum towers, to provide the benefits of modularity and replaceable cartridges, and/or the like. Accordingly, at least certain embodiments of the present invention, provide a new or improved liquid degassing membrane contactor which addresses the need for a new or improved liquid degassing membrane contactor and/or methods of manufacture and/or use thereof.

In accordance with at least selected embodiments of the present invention, an improved liquid degassing membrane contactor or module includes a high pressure housing and at least one degassing cartridge therein. It may be preferred that the high pressure housing is a standard (or retrofitted or modified), ASME certified, reverse osmosis (RO) or water purification high pressure housing or vessel (made of, for example, polypropylene, polycarbonate, stainless steel, corrosion resistant filament wound fiberglass reinforced epoxy tubing, with pressure ratings of, for example, 150, 250, 300, 400, or 600 psi, and with, for example 3, 4 or 6 ports, and an end cap at each end) and that the degassing cartridge is a self-contained, hollow-fiber membrane cartridge adapted to fit in the high pressure housing or vessel.

In at least one embodiment, such a self contained liquid membrane contactor cartridge may include a perforated center tube, a first mat comprising a plurality of first hollow fiber membranes each having a first end and a second end both being open, an optional baffle separating the hollow fiber mat into two areas, a cartridge shell, casing or housing, and potting at each end. The first and second membrane ends are open, for example, to allow strip or sweep gas to pass there through. It may be preferred that the baffle is formed of a center tube connector joining first and second sections of the center tube and by epoxy that is applied over the center tube connector in the center of the mat or bundle while winding forming a dam or block through the entire thickness of the hollow fiber mat. It may also be preferred that the potting be made of epoxy and that the ends of the potting be cut off to form the open first and second ends following potting.

In accordance with at least one embodiment, the center tube forms an opening in each end of the cartridge and is perforated along its length to provide for liquid to flow through the cartridge and over the hollow fibers. The center tube opening in each end of the cartridge is adapted to be in fluid communication with the respective ports in the end caps of the high pressure housing or vessel. For example, a hollow or tubular adapter or pipe may be used to connect the cartridge openings with the ports in the end caps.

In accordance with at least selected embodiments, the high pressure degassing module includes two or more cartridges in a single RO high pressure housing. According to at least particular possibly preferred embodiments, the high pressure degassing module includes two or more cartridges in a single high pressure housing or vessel with a sufficient space between adjacent cartridges to provide an annular area that serves as a mixing chamber or 'Gas Concentration Equalizing Gap' within the length of the lumens in the module. This chamber or gap allows for sweep gasses within the lumens closest to the center tube all the way out to the furthermost diameter to remix and equalize within the length of the module (between cartridges). Doing so allows the driving force of the fibers to increase where their efficiency is the highest (at the center tube) and to decrease where their efficiency is the lowest (at the outermost diameter). The end result is a significant increase in overall performance as compared to a module without this feature with equivalent membrane area. In one example, the Dissolved Oxygen (DO) removal efficiency of an 8×40 module (8"×40" contactor with two membrane cartridges with a gap there between) of the present invention is significantly better than a conventional degassing module (below 100 gpm) even though the membrane areas are roughly equivalent.

In accordance with at least one embodiment, the preferred RO housing is an 8"×40" or 8"×80" RO housing and the membrane cartridges are about 20", 40" or 80" in length.

In accordance with at least one embodiment, an array of two or more 8"×40" or 8"×80" degassing modules is formed of 6 port RO housings connected together.

In accordance with at least selected embodiments of the present invention, an improved liquid degassing membrane contactor or module includes a high pressure housing or vessel and at least one degassing cartridge therein. It may be preferred that the high pressure housing is a standard (or modified or retrofitted), ASME certified, reverse osmosis (RO) or water purification pressure housing or vessel (made of, for example, polypropylene, polycarbonate, stainless steel, corrosion resistant filament wound fiberglass reinforced epoxy tubing, with pressure ratings of, for example, 150, 250, 300, 400, or 600 psi, and with, for example 4 or 6 ports, and an end cap at each end) and that the degassing cartridge is a self-contained, hollow-fiber membrane cartridge adapted to fit in the RO high pressure housing.

Further, the present membrane contactors may offer a modular option for many applications and they can be put in virtually any area of a building. They may rapidly displace forced draft deaerators and vacuum towers in new systems as well as many older ones.

The present membrane contactors preferably use commercially available materials (for example, fiberglass high pressure housing, ABS cartridge shell, polypropylene hollow fibers), containment vessel and end cap components. The potting material is preferably epoxy, which is used in many other Liqui-Cel® products and has been proven in the field for years. Both of the preferred high performance Celgard® X40 and X50 microporous hydrophobic polypropylene hollow fibers are very cost effective for dissolved $CO_2$ and $O_2$ removal from water.

Such preferred devices may be clean enough to be used in the make up loop of a semiconductor plant. More specifically, they may be used to deoxygenate large make-up systems and to deoxygenate large water streams used in TFT plants. Additionally, they may offer a perfect solution for removing carbon dioxide ($CO_2$) prior to mixed bed or EDI technology to eliminate or reduce chemical usage and improve water quality exiting these technologies. They may also be used in boiler feed water applications for oxygen ($O_2$) removal to protect the boiler and piping from corrosion. In the boiler application, they may also have lower operating costs because blow down frequency is reduced and less energy is required for the contactor system operation.

The preferred changes made to materials, product design, use and replacement allow for more favorable economics of the preferred device for many large industrial and make-up applications. If purity and FDA compliance are important in the end use application, high-purity 8×40 or 8×80 membrane contactor embodiments are available for those end uses.

In accordance with at least selected possibly preferred embodiments, the present membrane contactors (or membrane cartridges) utilize thousands of Celgard® microporous polyolefin (PO) hollow fibers, such as hydrophobic polypropylene (PP) or polymethyl pentene (PMP, or poly(4-methyl-1-pentene)) hollow fibers knitted into an array that is wound around a distribution tube with a central baffle. During preferred operation, the liquid flows over the shell side or shell-side (outside) of the hollow fibers. The preferred design incorporates a baffle in the middle of the hollow fiber bundle in the contactor (or cartridge), which directs the liquid radially across the array. A strip gas or vacuum, either separately or in combination, is applied on the lumen side or lumenside (inside) of the hollow fibers.

Because of its hydrophobic nature, the membrane acts as an inert support to allow direct contact between a gas and liquid phase without dispersion. The dissolved gas in the liquid travels through the pore by applying a higher pressure to the liquid stream relative to the gas stream.

The membrane contactors of the present invention may be used around the world for adding or removing oxygen ($O_2$), carbon dioxide ($CO_2$) and nitrogen ($N_2$) to or from different liquids in the Semiconductor, Power, Pharmaceutical, Photographic, Food and Beverage, and many other industries. Such contactors may also be used to add gasses to liquids to enhance megasonic cleaning. The beverage industry looks to membrane contactors for carbonation, nitrogenation and $O_2$ removal. These reflect only a few examples of the variety of applications where the present membrane contactors may be used.

Additionally, Membrana-Charlotte offers liquid ring vacuum pumps, eductors and Orbisphere sensors to complement such membrane contactors.

At least selected embodiments of the present invention are directed to degassing a liquid with a membrane contactor. A liquid having a dissolved gas is introduced into a contactor which is connected to a strip gas and/or vacuum source. The contactor (or one or more cartridges) preferably has a perforated core, a plurality of hollow fiber membranes, a tube sheet affixing each end of the fibers, and a shell having gas and liquid openings. The shell encloses the fibers, the tube sheets, and the core. The hollow fiber lumens are in fluid communication with the strip gas and/or vacuum source. Liquid enters the contactor via the core's open end, radially exits the core, crosses over the membranes within the shell, re-enters the core, and exits the contactor (or cartridge). The dissolved gas thereby diffuses from the liquid across the membrane into the lumen. The degassed or debubbled liquid exiting the contactor or contactor array may have a dissolved gas content (or residual $O_2$) of less than 100 ppb, preferably less than 50 ppb, more preferably less than 20 ppb.

In accordance with certain embodiments of the invention, there are provided a novel contactor, contactor array and/or a system for degassing a liquid including one or more such contactors or arrays.

In accordance with at least one embodiment of the invention, the contactor includes a perforated core, a plurality of microporous hollow fibers, and a shell, housing or vessel. The fibers surround the core and have two ends. A tube sheet affixes the ends of the fibers. A baffle is located between the tube sheets. The hollow fibers are one of open or closed at the baffle. The shell, housing or vessel encloses the fibers, tube sheets, and the baffle.

In accordance with at least another embodiment of the invention, a system for degassing liquids includes a source of liquid containing a gas, a source of vacuum, and at least one contactor including a perforated core, a plurality of microporous hollow fibers, a baffle, and a shell, housing or vessel. The source of liquid is in fluid communication with one end of the core. The source of vacuum is in fluid communication with the lumens of the hollow fibers through the tube sheets. The liquid passes out of the core, across the fibers, around the baffle, across the fibers, and back into the core.

In accordance with at least one object of the invention, there are provided new or improved spiral-type hollow fiber membrane fabric-containing cartridges and modules containing flow-directing baffles, for separations and other phase contact applications.

It is another object of at least selected embodiments of this invention to provide such cartridges and modules in which flow-directing baffles are axially positioned to promote radial flow of fluids throughout the hollow fiber bundle.

It is yet another object of at least certain embodiments this invention to provide such cartridges and modules in which feed fluid flow is intermittently directed near to and/or through a portion of the core, and subsequently out to the periphery of the bundle.

It is still another object of at least particular embodiments this invention to provide a number of cartridge and module designs yielding radial feed fluid flow patterns which can be selected for particular desired membrane contact regimes.

It is an additional object of at least certain embodiments this invention to provide methods for constructing the improved contactors and/or cartridges.

Further objects will be set forth in the discussion below.

At least certain embodiments the present invention are directed to degassing a liquid such as seawater with a series or parallel array or system of a plurality of high pressure membrane contactors. A liquid having a dissolved gas is introduced into the contactors of the array or system and the contactors are connected to a sweep gas, strip gas, and/or vacuum source. Preferably, each contactor has at least one membrane cartridge including a perforated core, a plurality of hollow fiber membranes, a tube sheet affixing each end of said fibers, and a cylindrical shell. The shell substantially encloses the fibers, the tube sheet, and the core. More preferably, the hollow fiber lumens are in fluid communication with the sweep gas, strip gas, and/or vacuum source. Liquid enters the contactor via an extension of the core's open end, radially exits the core, crosses over the membranes within the shell, flows around at least one baffle, and exits the contactor via an extension of the core's other open end. The dissolved gas thereby diffuses from the liquid across the membrane into the lumen. The liquid exiting the array or system of a plurality of high pressure membrane contactors may have a dissolved gas content to less than 10 ppb. The array or system of a plurality of high pressure membrane contactors is preferably a skid mounted or pallet mounted mobile array of at least three high pressure membrane contactors each having a high pressure housing or vessel and at least one membrane cartridge therein. The preferred array or system has a plurality of high pressure membrane contactors each having an RO high pressure housing or vessel. The preferred array or system has a plurality of high pressure membrane contactors each including at least two membrane cartridges with an optional gas equalizing gap there between.

According to at least selected embodiments of the invention, improvements are provided in a high pressure spiral-type hollow fiber membrane fabric-containing module or contactor, comprising:
1) A high pressure module housing;
2) A pair of end caps adapted to fit in or on the ends of said module housing;
3) Liquid end ports in each of said end caps;
4) At least one gas port in at least one of said end caps or in the side of said module housing near one end thereof;
5) At least one membrane cartridge adapted to fit in said module housing, each membrane cartridge comprising:
   a. a plurality of hollow fiber membranes each having a lumen, said membranes being formed into a fabric-like array in which the hollow fibers substantially are mutually-parallel and constitute the fabric weft, and are held in spaced-apart relationship by filaments constituting the fabric warp;
   b. the array being wound upon an axis which is substantially parallel to the hollow fibers into a spirally-wound membrane bundle having two bundle ends and a cylindrical exterior surface;
   c. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers constituting a first one of the bundle ends being exposed and communicating with the exterior of the bundle;
   d. a cartridge shell, casing or housing having first and second housing ends and a cylindrical housing interior and being suitably shaped to contain the membrane bundle, the tube sheet (potting) adjacent the first cartridge housing end sealing the first bundle end to the cylindrical housing interior, said cartridge housing which contains the bundle defining two regions mutually communicating through the membrane including (i) a shell-side space exterior to the portion of the bundle between the tube sheets and within the housing, and (ii) a lumen-side space including the hollow fiber lumens and the first bundle end;
6) Wherein an interior face of a first of said end caps and an interior of said module housing adjacent the first cartridge housing end, together with the cylindrical housing interior and the first bundle end, seal a first module housing end and define a first chamber communicating with the membrane lumens;
7) Wherein an interior face of a second of said end caps and an interior of said module housing adjacent a second cartridge housing end, together with the cylindrical housing interior and a second bundle end, seal a second module housing end and define a second chamber communicating with the membrane lumens;
8) said liquid ends ports being operatively connected to the shell-side space of each said membrane cartridge, and arranged to permit fluid injection and withdrawal there through; and
9) the at least one gas port communicating with at least one of the first and second chambers, and arranged to permit gas injection and withdrawal there through.

The above improved high pressure spiral-type hollow fiber membrane fabric-containing module or contactor, further comprising:
1) At least two gas ports with one gas port in each of at least each of said end caps or in each side of said module housing near each end thereof.

The above improved high pressure spiral-type hollow fiber membrane fabric-containing module or contactor, further comprising:
1) At least two membrane cartridges adapted to fit in said module housing.

The above improved high pressure spiral-type hollow fiber membrane fabric-containing module or contactor, further comprising:
1) a hollow mandrel in each of said membrane cartridges having a longitudinal axis and a cylindrical exterior surface, an axial bore, and perforations along the surface which communicate with the bore.

The above improved high pressure spiral-type hollow fiber membrane fabric-containing module or contactor, further comprising:
1) both of the lumen ends of the hollow fibers are exposed and communicate with the exterior of the bundle.

The above improved high pressure spiral-type hollow fiber membrane fabric-containing module or contactor, further comprising:
1) wherein said module housing is a high pressure vessel or housing such as a RO high pressure vessel.

The above improved high pressure spiral-type hollow fiber membrane fabric-containing module or contactor, further comprising:
1) wherein the cartridge housing need not support the high pressure as the module housing will prevent the cartridge housing from bursting and if the cartridge housing swells under pressure, the module housing will contain and restrain the cartridge housing.

The above improved high pressure spiral-type hollow fiber membrane fabric-containing module or contactor, further comprising:
1) wherein the module housing will contain and restrain the cartridge shell should the cartridge shell swell or fail under pressure.

The above improved high pressure spiral-type hollow fiber membrane fabric-containing module or contactor, further comprising:
1) wherein the module housing and end caps will contain and restrain the membrane cartridge should it fail.

At least selected embodiments of the invention also provide methods for the manufacture and/or use of the above spiral-type hollow fiber membrane fabric-containing modules and/or cartridges.

In accordance with at least selected embodiments of the invention, at least certain objects provide contactors or modules effective for some applications, adapted for the degassing of high flow rate liquids and/or high pressure liquids, such as seawater at about 50 gpm or more and/or about 300 psi or more, having high pressure ratings, having ASME code ratings, having customer familiarity and acceptance, having lower cost, having lower weight, not using metal or other corrosive materials, having modularity, having replaceable self contained cartridges, having porting options, having different module sizes, having different module array sizes, including high pressure cartridges, not having excessively long fibers, having high liquid flow rates, eliminating or reducing gas concentration variation, allowing for commercial production, and/or the like.

In accordance with at least selected embodiments of the invention, at least certain objects provide non-metallic, non-PVC, modular, high flow rate, high pressure membrane contactors that have long been the subject of interest to membrane developers, that can replace or augment large vacuum towers to degasify water, seawater, and the like (for example, at power plants, on offshore oil rigs, or the like to degas water, process water, storage tank water, seawater, salt water, or the like).

In accordance with at least selected embodiments of the invention, at least certain objects provide an improved liquid degassing membrane contactor that allows for relatively small, modular, degassing modules to be used in industrial processes, at power plants, on offshore oil rigs or drilling platforms, to replace or augment vacuum towers, to provide the benefits of modularity and replaceable cartridges, and/or provide an improved liquid degassing membrane contactor, and/or methods of manufacture and/or use thereof, and/or the like.

Further embodiments and/or the various embodiments may be described or detailed in the discussion below, and defined in the appended claims.

BRIEF DESCRIPTION OF THE DRAWINGS

For the purpose of illustrating the embodiments or aspects of the invention, there is shown in the drawings a form that is presently possibly preferred; it being understood, however, that the present invention is not limited to the precise embodiments, aspects, arrangements, and/or instrumentalities shown.

FIG. 2 is a schematic longitudinal cross-sectional illustration of the module of FIG. 1 taken along line A-A in FIG. 3 (with the side ports rotated downward);

FIG. 3 is an end view of the module of FIG. 1;

FIG. 5 is a longitudinal cross-sectional view of the cartridge of FIG. 4 taken along line B-B in FIG. 6;

FIG. 6 is an end view of the cartridge of FIG. 4;

FIG. 14 is a cross section of the shell of FIG. 13 taken along line C-C in FIG. 15;

FIG. 24 is a side view illustration of another exemplary module or contactor of at least one embodiment of the present invention;

FIG. 25 is a schematic longitudinal cross-sectional illustration of the module of FIG. 24 taken along line D-D in FIG. 26;

FIG. 25A is a perspective view of the hollow cartridge connector of FIG. 25;

FIG. 26 is an end view of the cartridge of FIG. 24;

FIG. 27 is a schematic longitudinal cross-sectional illustration of yet another exemplary module or contactor of at least one embodiment of the instant invention showing one use of the module;

FIG. 35 is an example of a degas skid of at least one embodiment of the instant invention using a multiple module array like that of FIG. 34;

FIG. 38 is a schematic cross section illustration of an example contactor of at least one embodiment of the instant invention with two cartridges with a Gas Equalization Gap there between;

DETAILED DESCRIPTION OF THE INVENTION

Figure 1:
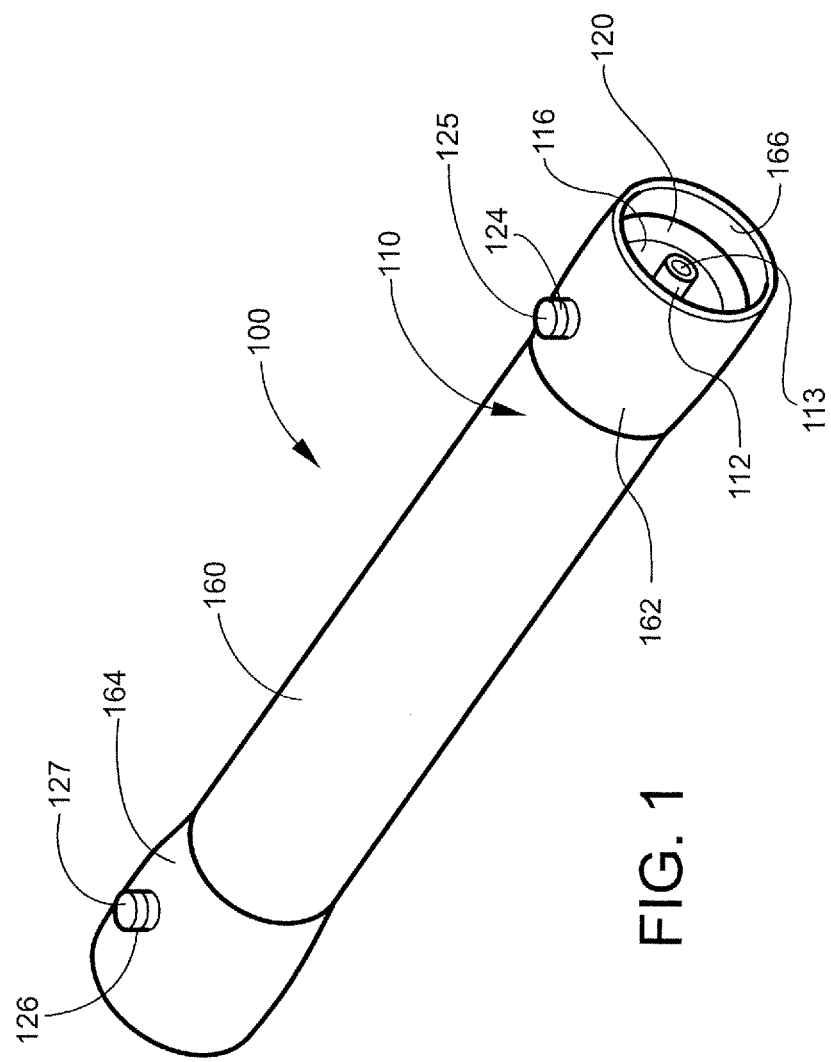
FIG. 1 is a perspective view illustration of an exemplary module or contactor of at least one embodiment of the instant invention.

The instant application relates to membrane contactors and their methods of manufacture and use. In at least selected embodiments, the present invention is directed to high pressure liquid degassing membrane contactors and their methods of manufacture and use. In at least certain embodiments, the present invention is directed to degassing a liquid having a dissolved or entrained gas or gases with a membrane contactor. Preferably, the contactor has a pressure vessel or housing enclosing at least one membrane cartridge including a perforated core, a plurality of hollow fiber membranes, a tube sheet affixing each end of said hollow fibers, and a shell. Preferably, the hollow fiber lumens are in fluid communication with a sweep gas, a vacuum, or both, and the liquid to be degassed enters the contactor via an open end of the perforated core, radially exits the core perforations, crosses over the exterior (lumenside) of the membranes within the shell, and exits the contactor with less dissolved or entrained gas. The dissolved gas preferably diffuses from the liquid across the microporous membrane into the lumen.

In accordance with at least selected embodiments of the present invention, an improved liquid degassing membrane contactor or module includes a high pressure housing and at least one degassing cartridge therein. It may be preferred that the high pressure housing is a standard (or modified or retrofitted), ASME certified, reverse osmosis (RO) or water purification pressure housing or vessel (made of, for example, polypropylene, polycarbonate, stainless steel, corrosion resistant filament wound fiberglass reinforced epoxy tubing, with pressure ratings of, for example, 150, 250, 300, 400, or 600 psi, and with, for example 4 or 6 ports, and an end cap at each end) and that the degassing cartridge is a self-contained, hollow-fiber membrane cartridge adapted to fit in the high pressure housing or vessel.

In accordance with at least possibly preferred selected embodiments of the present invention, an improved liquid degassing membrane contactor or module includes a high pressure housing and at least one degassing cartridge therein. It may be preferred that the high pressure housing is a standard, ASME certified, reverse osmosis (RO) or water purification pressure housing or vessel (made of, for example, polypropylene, polycarbonate, stainless steel, corrosion resistant filament wound fiberglass reinforced epoxy tubing, with pressure ratings of, for example, 150, 250, 300, 400, or 600 psi, and with, for example 4 or 6 ports, with at least the side or gas ports working (sealing) under pressure or vacuum, and an end cap at each end) and that the degassing cartridge is a self-contained, hollow-fiber membrane cartridge adapted to fit in the RO high pressure housing.

In at least one embodiment, such a self contained liquid membrane contactor cartridge may include a perforated center tube, a first mat comprising a plurality of first hollow fiber membranes each having a first end and a second end both being open, an optional baffle separating the hollow fiber mat into two areas, a cartridge shell or housing, and potting at each end. The first and second membrane ends are open, for example, to allow strip or sweep gas to pass there through. It may be preferred that the baffle is formed of a center tube connector joining first and second sections of the center tube and by epoxy that is applied over the center tube connector in the center of the mat or bundle while winding forming a dam or block through the entire thickness of the hollow fiber mat. It may also be preferred that the potting be made of epoxy and that the ends of the potting be cut off to form the open first and second ends following potting.

In accordance with at least one embodiment, the center tube forms an opening in each end of the cartridge and is perforated along its length to provide for liquid to flow through the cartridge and over the hollow fibers. The opening in each end of the cartridge is adapted to be in fluid communication with the ports in the end caps of the RO housing. For example, a hollow or tubular adapter or pipe may be used to connect the cartridge openings with the ports in the end caps.

In accordance with at least selected embodiments, the high pressure degassing module includes two or more cartridges in a single RO housing.

In accordance with at least one embodiment, the preferred RO housing is an 8"×40" or 8"×80" RO housing and the cartridges are about 20", 40" or 80" in length.

In accordance with at least one embodiment, an array of two or more 8"×40" or 8"×80" degassing modules is formed of 6 port RO housings connected together.

In accordance with one possibly preferred aspect of the present invention, there is provided a commercially viable high pressure degassing contactor having a high pressure housing or vessel and at least one membrane cartridge therein.

In accordance with another possibly preferred aspect of the present invention, there is provided a commercially viable high pressure degassing contactor having a standard RO high pressure housing or vessel and at least one membrane cartridge therein.

In accordance with yet another possibly preferred aspect of the present invention, there is provided a commercially viable high pressure degassing contactor having a standard RO high pressure housing or vessel and at least two membrane cartridges therein.

In accordance with still yet another possibly preferred aspect of the present invention, it was discovered that a commercially viable, high pressure liquid degassing contactor could be constructed using a standard RO high pressure housing or vessel and at least one membrane cartridge adapted to fit in the vessel.

The possibly preferred membrane contactors of the present invention may make it possible to transfer gas to or from an aqueous stream without dispersion. Such membrane contactors may contain thousands of Celgard® microporous polyolefin, for example, hydrophobic polypropylene, hollow fibers knitted into an array (see FIG. 41) that is wound around a distribution tube and collection tube (portions of a perforated center tube). The hollow fibers are preferably arranged in a uniform open packing, allowing greater flow capacity and utilization of the total membrane surface area. Because the hollow fiber membrane is preferably hydrophobic, the aqueous stream will not penetrate the pores. The gas/liquid interface is immobilized at the pore by applying a higher pressure to the aqueous stream relative to the gas stream. Unlike dispersed-phase contactors such as packed columns, the present possibly preferred membrane contactors provide a constant interfacial area for transfer over the entire operating range of flow rates.

Although the possibly preferred present membrane contactors utilize a microporous membrane, the separation principle differs substantially from other membrane separations such as filtration and gas separation. With such preferred hollow fiber membrane contactors, there is no convective flow through the pores as occurs in other membrane separations. Instead, the preferred membrane acts as an inert support that brings the liquid and gas phases in direct contact without dispersion. The mass transfer between the two phases is governed entirely by the pressure of the gas phase. Because of the preferred Celgard® hollow fibers and the contactor geometry, the surface area per unit volume is an order of magnitude higher than traditional technologies such as packed columns, forced draft deaerators and vacuum towers. This high level of surface area to volume leads to a dramatic reduction in contactor/system size for a given level of performance.

It is noted that although the baffled membrane design appears to be preferred, there appear to be three design variants for the presently described membrane contactors. The baffled membrane design uses a radial liquid flow path around a central baffle. Liquid flows on the outside (shell side or shellside) of the hollow fibers. The NB, or No Baffle design, does not utilize a central baffle, but it is still a radial flow device. The liquid outlet port on the no baffle design is located in the middle of the device rather than at the contactor ends as in the baffled design. One end of the NB contactor is capped and allows liquid to flow outward or radially across the fibers from a central distribution tube. This variant appears best suited for vacuum operation. The third variant or design allows for liquid flow inside of the hollow fiber (lumen side or lumenside). These devices are not radial flow devices and appear best suited for small flow applications.

The present possibly preferred membrane contactors may utilize one of two primary fiber types for absorption/stripping techniques for water. The Celgard® X-40 membrane has a thicker wall with a smaller inside diameter and is recommended for oxygen removal. The Celgard® X-50 membrane has a slightly thinner wall with a larger inside diameter. (see FIGS. 41 and 42) This feature allows for greater carbon dioxide removal as compared to the X-40 membrane.

Below is a comparison of the Celgard® X-40 and X-50 hollow fibers.

TABLE 1

Celgard ® X-40 and X-50 Hollow Fiber Comparison

| Characteristic | Units | Fiber Type | |
|---|---|---|---|
| | | X-40 | X-50 |
| Fiber OD (nominal) | Microns | 300 | 300 |
| Fiber ID (nominal) | Microns | 200 | 220 |
| Bubble Point | psi | 240 | 240 |
| Load at Break | grams | 430 | 430 |
| Porosity | % | 25 | 40 |
| Average Pore Size | Microns | 0.03 | 0.04 |

A possible third fiber variant, a microporous polyolefin, was introduced in smaller contactors for gas transfer of low surface tension fluids and the fluid always flows on the shell side in these devices. Additionally, an XIND fiber was introduced in larger Industrial Contactors, and is geared to non-FDA degassing applications.

When using the Baffled or No-Baffle Membrane Contactors in gas absorption applications such as aeration or carbonation, etc., a gas is introduced into the inside (lumen side) of the hollow fiber membrane and the liquid phase is introduced to the outside (shell side) of the hollow fiber. The partial pressure of the gas and the water temperature controls the amount of gas dissolved in the liquid phase. When using Lumen Side Liquid membrane contactors (non radial flow devices) in this application, the liquid is introduced to the lumen side while the gas is introduced to the shell side.

When using the Baffled or No Baffle Membrane Contactors in gas stripping applications such as decarbonation or deoxygenation, a vacuum or stripping gas or combination of those is applied to the lumen side of the hollow fiber. The liquid stream is introduced to the outside of the fiber. The partial pressure of the gas is decreased to remove dissolved gases from the liquid phase. When using Lumen Side Liquid membrane contactors (non radial flow devices) in this application, the liquid is introduced to the lumen side while the gas/vacuum is applied to the shell side.

Referring to the drawings wherein like numerals indicate like elements, there is shown, in FIG. 1, one embodiment of a module or contactor 100 such as a high pressure liquid degassing membrane contactor. Module 100 includes a pressure housing or vessel 110, end ports 112, 114, end caps 116, 118, end cap locks 120, 122, and side ports 124, 126. Most preferably the module is adapted for liquid degassing, and the end ports 112, 114 are liquid ports to preferably receive liquid to be degassed, debubbled, or the like, and side ports 124, 126 are gas ports to preferably respectively receive and remove sweep gas, strip gas, or the like, and/or for one or both side ports to be connected to vacuum (to be connected to a vacuum source or pump) to facilitate removal or control of the entrained or dissolved gas or gases.

Although it may be less preferred than the above, module may be adapted for adding one or more gases to the liquid, and the end ports 112, 114 may be liquid ports to receive liquid to be treated or modified, and side ports 124, 126 may be gas ports to respectively receive or remove carbon dioxide, nitrogen, vacuum, and/or the like, or for both side ports to be connected to gas or vacuum (to be connected to a gas or vacuum source or pump) to facilitate control or addition of a gas or gases.

Although it may be still less preferred than above, the module may be adapted for controlling or adding humidity to a gas or air stream, and the end ports 112, 114 may be liquid ports to receive water, and side ports 124, 126 may be gas ports to respectively receive and remove sweep gas, strip gas, air, or the like, and/or for one or both side ports to be connected to vacuum (to be connected to a vacuum source or pump) to facilitate creation, addition, removal, and/or control of water vapor, humidity, or the like.

Although it may be yet less preferred than above, the end ports 112, 114 may be gas ports, and side ports 124, 126 may be liquid ports. Although it may be still yet less preferred, the end ports 112, 114 may be liquid ports, and side ports 124, 126 may be liquid ports, or the end ports 112, 114 may be gas ports, and side ports 124, 126 may be gas ports.

For at least certain applications, the preferred arrangement may be a countercurrent flow of liquid and gas. For example, liquid may flow from port 112 to port 114 while gas flows from port 126 to port 124, or liquid may flow from port 114 to port 112 while gas flows from port 124 to port 126. For at least certain other applications, the preferred arrangement may be a common direction flow of liquid and gas. For example, liquid may flow from port 112 to port 114 while gas flows from port 124 to port 126, or liquid may flow from port 114 to port 112 while gas flows from port 126 to port 124. For at least certain still other applications, the preferred arrangement may be flow of liquid from one liquid port to the other while gas is drawn out of both gas ports. For example, both gas ports 124 and 126 may be connected to vacuum (such as to a vacuum pump). For at least certain yet other applications, the preferred arrangement may be flow of liquid from one liquid port to the other while gas is forced into both gas ports. For example, both gas ports 124 and 126 may be connected to a gas to be introduced into the liquid (such as for carbonation, nitrogenation, or the like).

Many industries have the need to remove, add or control dissolved gasses in liquids. Module or contactor 100 and similar membrane contactors as shown and described herein can be used in such industries where gasses need to be removed, controlled or added. In other words, there are many membrane degassing and gas transfer applications where the present liquid degasifiers could be used.

With reference to FIGS. 2 and 4 to 6, module 100 may include a cartridge 130. Cartridge 130 includes a cylindrical shell, casing or housing 132, with exterior o-ring grooves 134, 136 and an interior surface 133 (see FIGS. 7 and 8). Further, cartridge 130 includes potting 138, 140 for sealing the ends of the cartridge between the casing interior 133 and the center tube 154, for securing the ends of the hollow fibers, and for forming tube sheets. Potting 138, 140 has respective central end openings 142, 144 preferably defined by the exterior of the center tube 154.

As shown in FIG. 2, module 100 preferably includes cartridge 130 and adapters or connectors 146, 148 each having a raised portion 149, and a first end 150 and second end 152 adapted to mate with or fit in center tube openings 151 and end port openings 153, respectively.

As shown in FIG. 5, cartridge 130 also preferably includes center tube 154, baffle 155 and membrane mat 156.

FIG. 1 shows exemplary module or contactor 100 to be a 4 port module having two end or shell side ports 112, 114 and two side or lumen side ports 124, 126. In accordance with a possibly most preferred embodiment, the housing or vessel 110 has the appearance of and is preferably a standard reverse osmosis (RO) or high pressure water purification type high pressure housing or vessel, with end caps, end cap locks, end ports, and side ports. For example, housing 110 may be a 100 psi, preferably a 300 psi or higher rated, RO or high pressure water purification type housing, such as, for example, an 8"×40", 8"×80", or 16"×80" RO or high pressure water purification housing or vessel, such as a fiberglass or stainless steel vessel. For oil rig or off shore drilling platform degassing applications, it is preferred to use a non-metallic, corrosion resistant, fiberglass housing.

In accordance with a possibly more preferred embodiment, the module 100 has the appearance of a standard reverse osmosis (RO) or high pressure water purification type high pressure housing or vessel, with end caps, end cap locks, end ports, and side ports, and preferably the seals of the side ports 124, 126 have been modified for reduced pressure gas or vacuum applications. Some standard RO or high pressure water purification type side port seals are only adapted for pressurized liquid applications and may leak when reduced pressure gas or vacuum is applied thereto.

FIGS. 2 and 3 show the module 100 of FIG. 1 rotated 180 degrees with the side ports 124, 126 pointing downward.

Preferably, housing or vessel 110 of module 100 has an elongated constant diameter central portion 160 and enlarged end portions 162, 164 (see FIGS. 1 to 3, 9 and 10). The openings 166, 168 in the ends 162, 164 of housing 110 may preferably be larger in diameter than the inner diameter of the elongate cylindrical opening 170 (see FIG. 10) of center section 160 adapted to receive cartridge 130. In accordance with a possibly preferred example, cartridge 130 has an outer diameter slightly smaller than the diameter of the opening 170 and the cartridge is sealed in the opening 170 near its ends by, for example, respective o-rings 172, 174 in grooves 134, 136. As with standard RO housings, end openings 166, 168 are adapted to receive end caps 116, 118 and end cap locks 120, 122 which secure the end caps in position in the housing 110 with the end ports 112, 114 receiving or mating with adapters 146, 148, which places or holds adapters 146, 148 in position and being received by center tube 154. When the end caps are locked in place, then preferably the cartridge, center tube, adapters, and end ports are locked or held in position. The raised portion 149 and a shoulder 180 of adapters 146, 148 limit the maximum that the respective adapter ends 152, 150 can be inserted in the respective end port and center tube openings 153, 151. Adapters 146, 148 preferably also include, for example, o-ring grooves 182, 184 for receiving respective o-rings which form fluid tight seals with the ends of the center tube and inner portions of the end ports.

As described above, the preferred module 100 has a very simple yet very effective construction. The shell side fluid or liquid is separated from the lumen side fluid or gas (except at the membrane interface). Preferably, standard parts such as standard housings, end caps, end ports, side ports, and end cap locks are used together with custom parts such as cartridges, center tubes, and adapters. Depending on the module end use or application, custom end ports, side ports, and/or end caps may need to be used.

Although the center tube 154 may be a single piece perforated pipe (with or without a center plug or flow restrictor), as shown in FIGS. 2, 5 and 16 to 21, it is preferred that center tube 154 be made of at least three parts: a first perforated tube portion 190, a second perforated tube portion 192, and a solid tube connector 194. As shown, the tube connector 194 preferably has respective threaded ends 191 and 193 adapted to mate with internal threads in the ends of tubes 190 and 192 adjacent the connector 194. Also, tube connector 194 preferably has a raised central grooved portion 195 for spacing the tubes 190, 192 and for aiding in forming baffle 155 from, for example, epoxy, as the membrane mat or fabric is wrapped around tube 154, and to help the baffle 155 stay in position after being formed. Similarly, each of tubes 190, 192 may preferably include ribs or grooves 202 near the end opposite connector 194 for aiding in forming potting 138, 140 from, for example, epoxy, after the membrane mat or fabric is wrapped around tube 154 and placed in casing 132, and to help the potting 138, 140 stay in position after being formed.

Preferably, each of the tubes 190, 192 has a smooth perforation free inner surface in the end adapted to receive end 150 of adapters 146, 148.

Membrane mat 156 is preferably separated into two membrane portions 196 and 198 by baffle 155. For example, if liquid to be degassed is flowing through module 100 from end port 112 to end port 114, the liquid flows through opening 113 in end port 112, through opening 186 in adapter 146, through opening 151 in tube 190, out through perforations or openings 200 in tube 190, around, for example, the hollow fibers in membrane mat portion 196, over baffle 155 (between baffle 155 and casing interior 133), around, for example, the hollow fibers in membrane mat portion 198, through perforations or openings 200 in tube 192, through opening 151 in tube 192, through opening 186 in adapter 148, and out through opening 115 in end port 114. In this example, tube 190 is a liquid distribution tube and tube 192 is a liquid collection tube.

In another example, the liquid to be degassed is flowing through module 100 from end port 114 to end port 112, the liquid flows through opening 115 in end port 114, through opening 186 in adapter 148, through opening 151 in tube 192, out through perforations or openings 200 in tube 192, around, for example, the hollow fibers in membrane mat portion 198, over baffle 155 (between baffle 155 and casing interior 133), around, for example, the hollow fibers in membrane mat portion 196, through perforations or openings 200 in tube 190, through opening 151 in tube 190, through opening 186 in adapter 146, and out through opening 113 in end port 112. In this example, tube 192 is a liquid distribution tube and tube 190 is a liquid collection tube.

Figure 39:
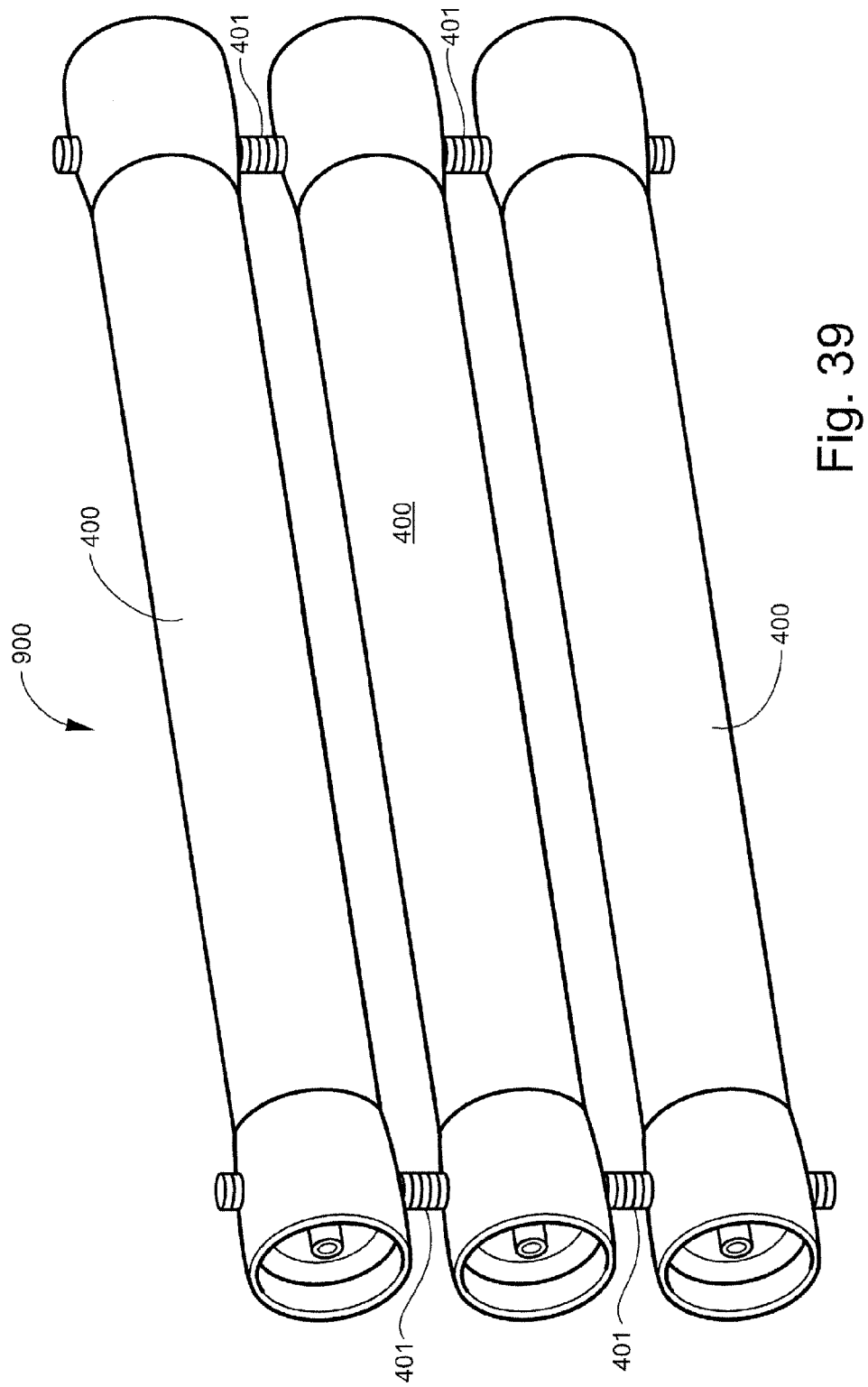
FIG. 39 is a schematic perspective illustration of an example of three 6 port contactors of at least one embodiment of the instant invention with their gas ports connected in series.

Although FIGS. 1 to 6 show a single cartridge 130 in housing 110 of module 100, it is contemplated that two or more cartridges may be used (see FIGS. 25, 27 and 39). Also, although it is preferred to use one or more cartridges 130 in the housing 110, one may form an integral membrane contactor in housing 110 by directly potting the membrane mat and center tube therein. Further, although it is preferred that the cartridge 130 have a shell or casing 132, one can use a shell-less cartridge in housing 110.

Although it is preferred to use one or more cartridges having baffled membrane mats therein, it is understood that non-baffled or multiple baffle configurations could be used. For example, membrane mats of short cartridges may be non-baffled, while those of long cartridges may include two or more baffles.

Figure 11:
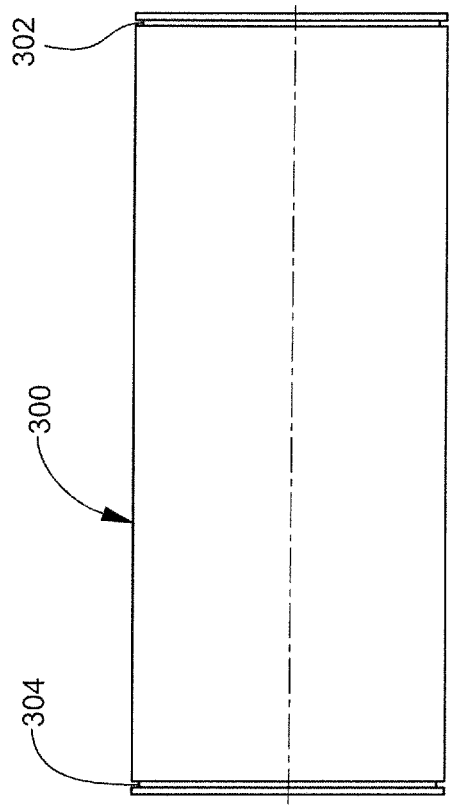
FIGS. 11 and 12 are respective side and end views that show another example of a cartridge housing or shell of at least one embodiment of the present invention.
Figure 12:
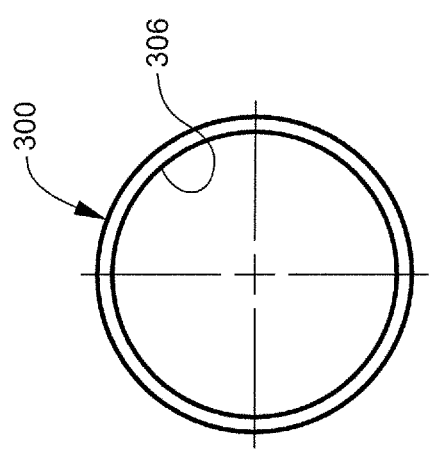

With reference to FIGS. 11 and 12, another exemplary cylindrical shell, casing or housing 300 has exterior o-ring grooves 302, 304 and an interior surface 306.

Figure 13:
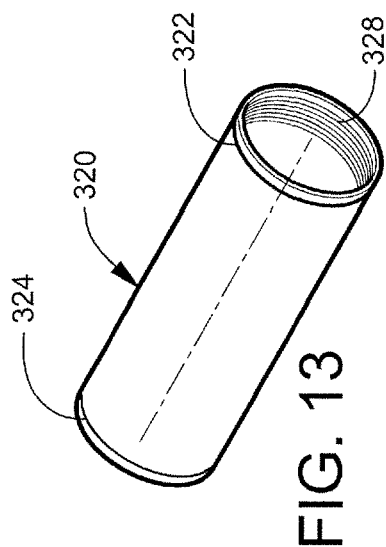
FIGS. 13, 14 and 15 are respective perspective, cross section and end views that show yet another example of a cartridge housing or shell of at least one embodiment of the instant invention.
Figure 15:
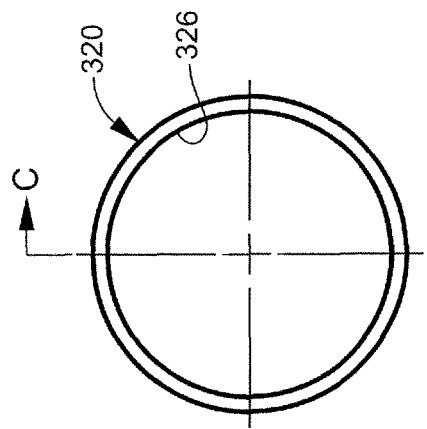
Figure 14:
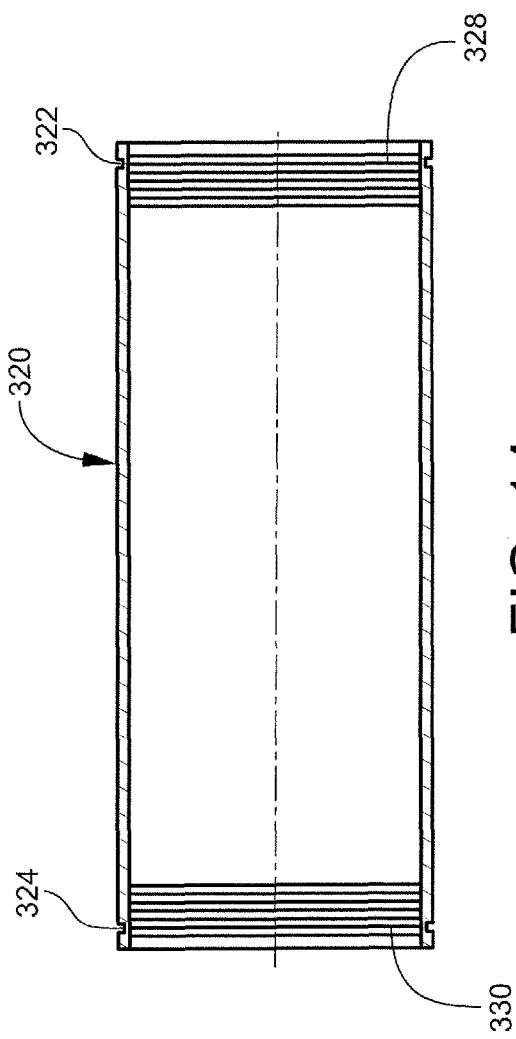
Figure 16:
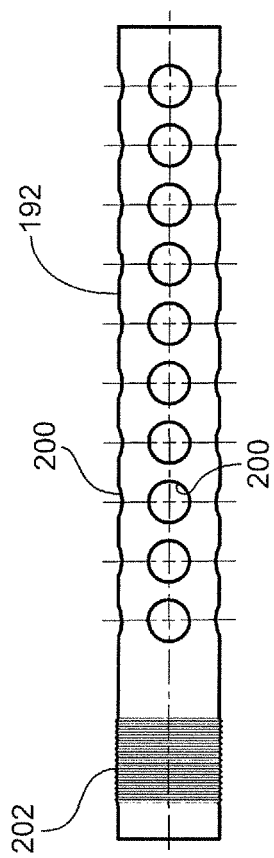
FIGS. 16 and 17 are respective side and end views of one half of the two piece center tube of FIGS. 2 and 5.
Figure 17:
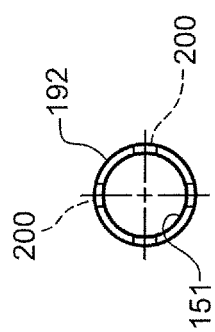

With reference to FIGS. 13 to 15, yet another exemplary cylindrical shell, casing or housing 320 has exterior o-ring grooves 322, 324, an interior surface 326, and grooved or ribbed portions 328, 330 to aid in forming and retaining the potting in the ends thereof.

Figure 4:
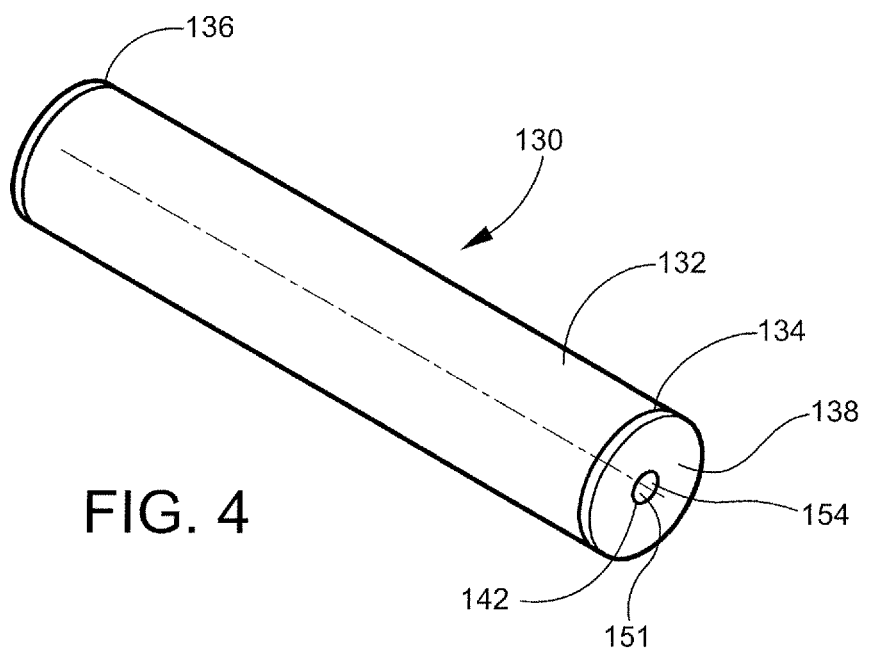
FIG. 4 is a perspective view of an exemplary cartridge from the module embodiment of FIG. 1.

With reference to FIGS. 4 to 6, it is noted that the cartridges are preferably self contained membrane contactor units, of a reasonable size and weight to be shipped, handled, inserted, and replaced. Such cartridges make it easy to construct and to maintain the modules. In accordance with a possibly preferred example, 8" diameter cartridges are 40" or less in length, and 16" diameter cartridges are 20" or less in length.

Figure 7:
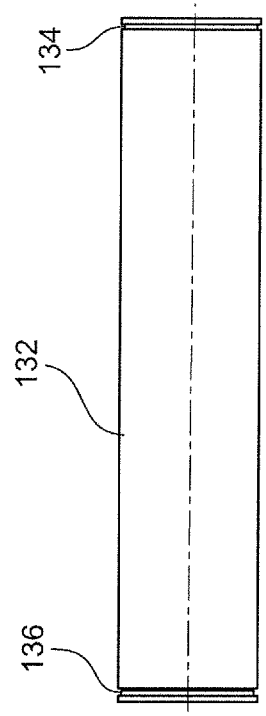
FIGS. 7 and 8 are respective side and end views of the cartridge housing or shell of FIG. 6.
Figure 8:
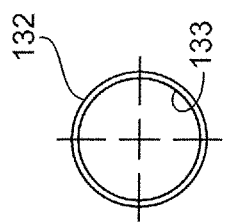

With reference to FIGS. 7 and 8, in one possibly preferred example, cartridge housing or shell 132 has an overall length of about 39.75 inches and an external diameter of about 7.9 inches and is formed of ABS polymer.

In another possibly preferred example, cartridge housing or shell 132 has an overall length of about 79.75 inches and an external diameter of about 7.9 inches.

In yet another possibly preferred example, cartridge housing or shell 132 has an overall length of about 79.75 inches and an external diameter of about 15.9 inches.

Figure 9:
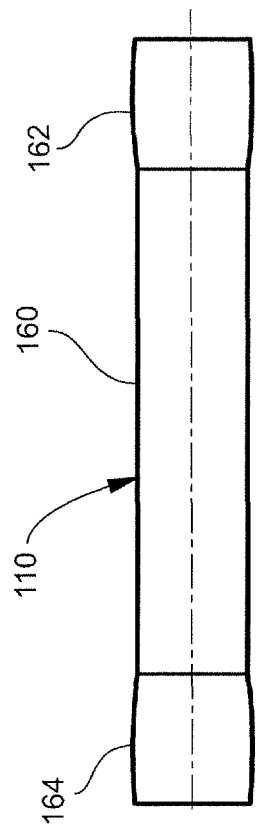
FIGS. 9 and 10 are respective side and end views of the pressure housing or vessel of FIG. 1.
Figure 10:
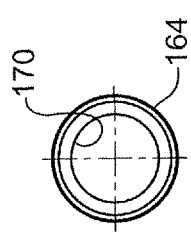

With reference to FIGS. 9 and 10, in one possibly preferred example, pressure housing or vessel 110 has an overall length of about 58.25 inches and an internal diameter of about 7.95 inches and is formed of fiberglass, stainless steel, or the like.

With reference to FIGS. 11 and 12, in one possibly preferred example, cartridge housing or shell 300 has an overall length of about 19.88 inches and an external diameter of about 7.9 inches and is formed of ABS polymer.

With reference to FIGS. 13, 14 and 15, in one possibly preferred example, cartridge housing or shell 320 has an overall length of about 20.28 inches and an external diameter of about 7.9 inches and is formed of ABS polymer.

Figure 18:
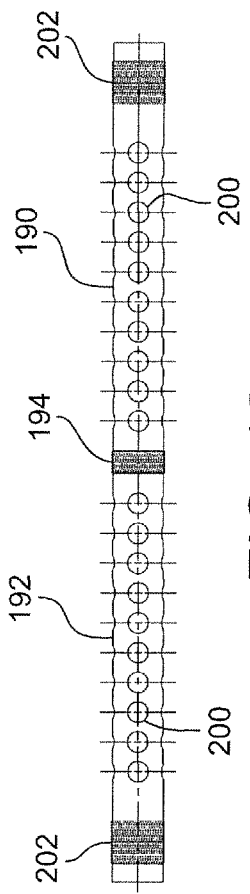
FIGS. 18 and 19 are respective side and end views of the assembled two piece center tube of FIGS. 2 and 5.
Figure 19:
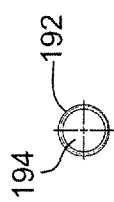
Figure 21:
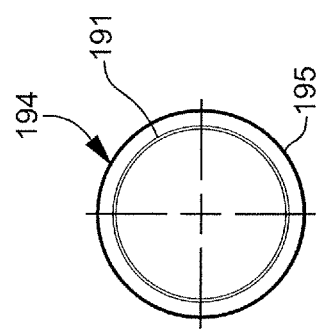
FIGS. 20 and 21 are respective side and end views of the solid center tube connector adapted to join two center tube sections as shown in FIG. 18.
Figure 20:
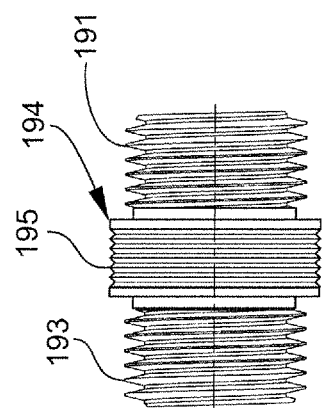

With reference to FIGS. 18 and 19, in one possibly preferred example, center tube 154 has an overall length of about 21 inches, an external diameter of about 1.3 inches, an internal diameter of about 1 inch and is formed of a polymer.

Figure 22:
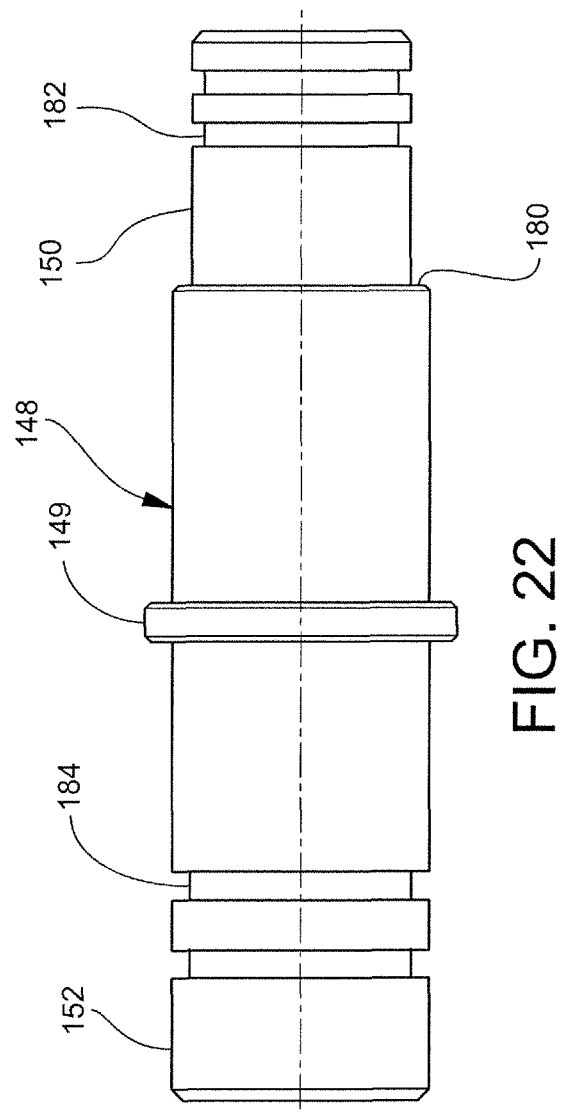
FIGS. 22 and 23 are respective side and end views that show the adapter of FIG. 2 for connecting the cartridge to the end port of the end cap.
Figure 23:
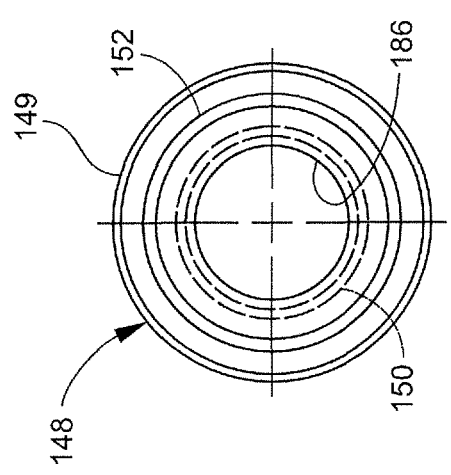

With reference to FIGS. 22 and 23, the adapters or connectors 146, 148 each have a center opening 186 providing for fluid flow there through.

With reference to FIGS. 24 to 26, a 6 port module 400 has a pressure housing 410 with 4 side ports 412, 414, 416, and 418, two end ports, two end caps, two adapters, and the like. The module or contactor 400 contains two membrane cartridges 420, 422 connected together preferably by a hollow connector 424 adapted to mate with or to be received in openings in the center tubes of the cartridges.

With particular reference to FIG. 25A, the connector 424 preferably includes a raised center portion 426 adapted to space the adjacent ends (or tube sheets) of cartridges 420 and 422 a small distance apart. In accordance with one example, connector 424 spaces the cartridges about 0.25 inches apart. This spacing or gap preferably provides for the equalization of the lumen side gas or gasses exiting one cartridge and entering the next cartridge. Such a gap between the open ends of the hollow fibers (the outer edge of the tube sheets) may preferably be from about 0.01 inch to about 2 inches, more preferably about 0.1 inch to about 0.5 inch, and most preferably about 0.15 inch to about 0.35 inch. The connector 424 also preferably includes respective ends 428 and 430 adapted to be fit with o-rings and received in the respective open ends of the center tubes of cartridges 420 and 422, and has a central opening 432 which allows for the flow of shellside liquid from the center tube of one cartridge to the center tube of the other cartridge. This two cartridge configuration provides a membrane contactor having superior performance over other contactors and configurations.

FIG. 27 shows a 4 port module 500 like the module 100 but with two cartridges like module 400. For example, module 500 may be an 8"×80" module with two 40" cartridges or could be a 16"×40" module with two 20" cartridges. Each of the cartridges in the module 500 has a perforated center tube, a baffle connected to a solid tube connector, a plurality of hollow fibers with a tube sheet at each end, and a casing. As shown, the Liquid and Sweep Gas have a countercurrent flow through the module for degassing the Liquid.

Figure 28:
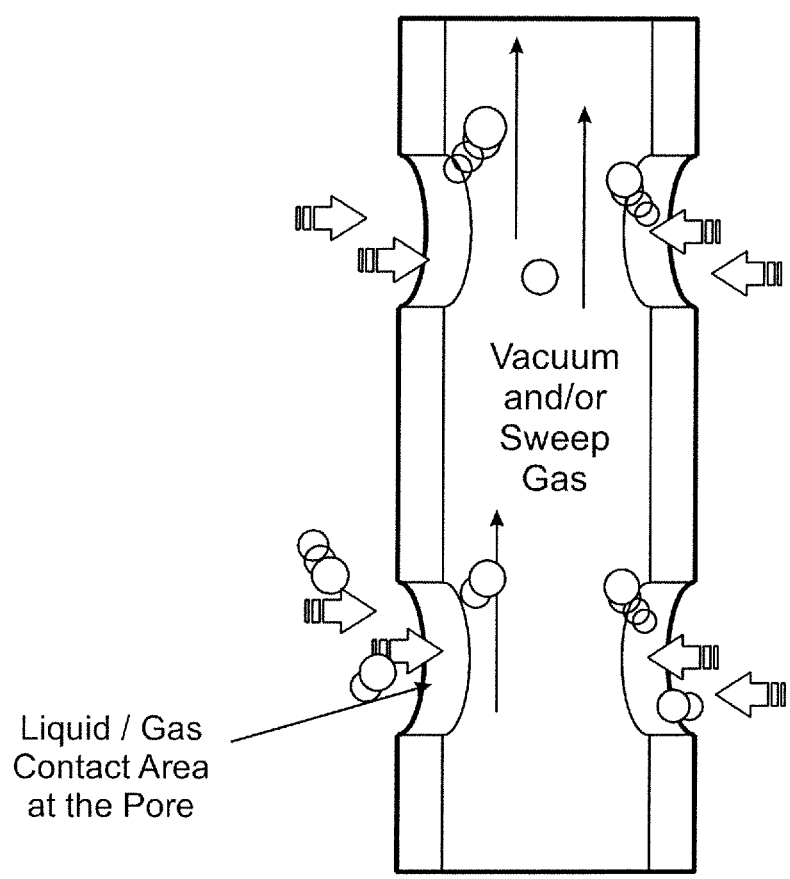
FIG. 28 is a schematic enlarged cross section illustration of gas transfer across a portion of a hollow fiber membrane.

With reference to FIG. 28, preferably for degassing a liquid such as water, the hollow fibers are hydrophobic microporous membranes having pores which block the passage of liquid but allow passage or transfer of gases and vapors.

Figures 29, 30, 31:
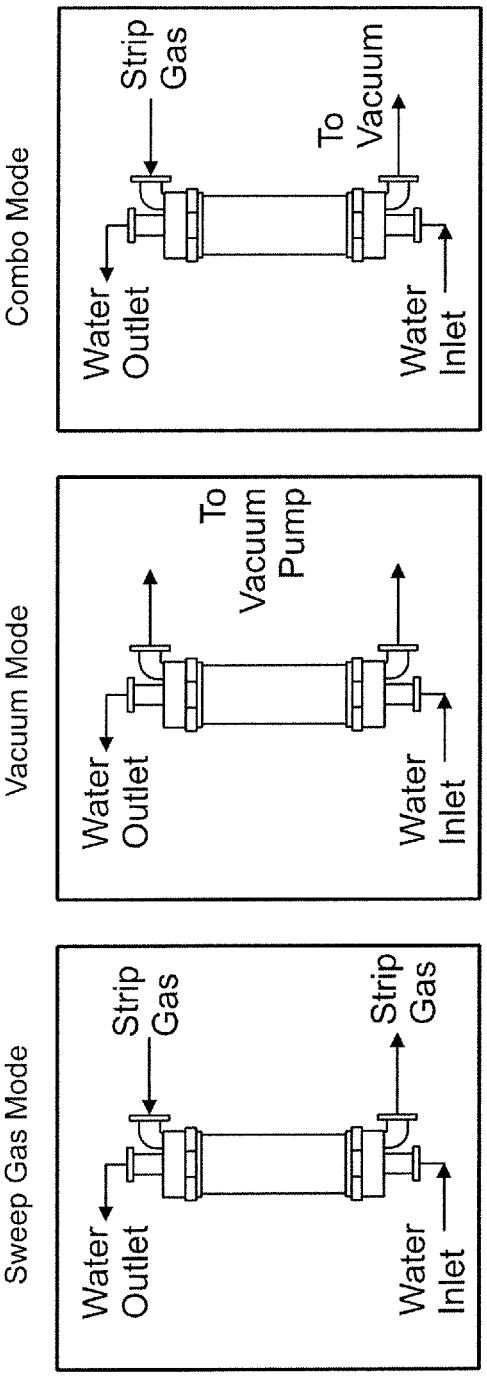
FIGS. 29, 30 and 31 are schematic illustrations of use of modules in respective Sweep Gas Mode, Vacuum Mode, and Combo Mode.

FIGS. 29, 30 and 31 illustrate various uses or modes of modules or contactors (Sweep Gas, Vacuum, and both).

Figure 32:
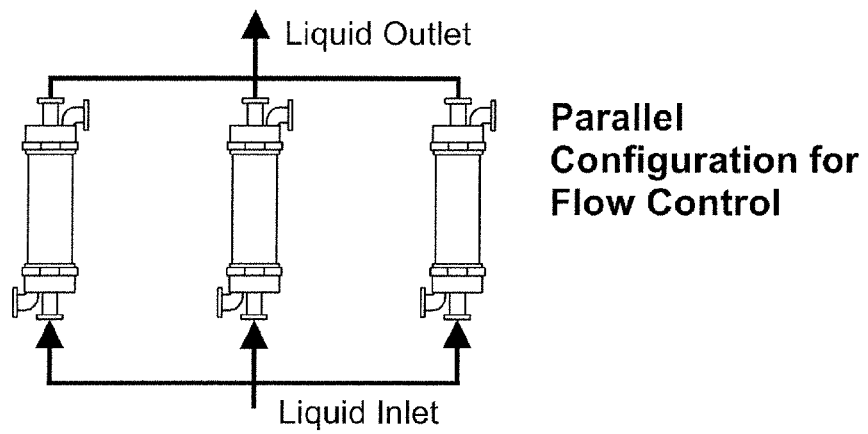
FIGS. 32 and 33 are schematic illustrations of respective parallel and series contactor configurations.
Figure 33:
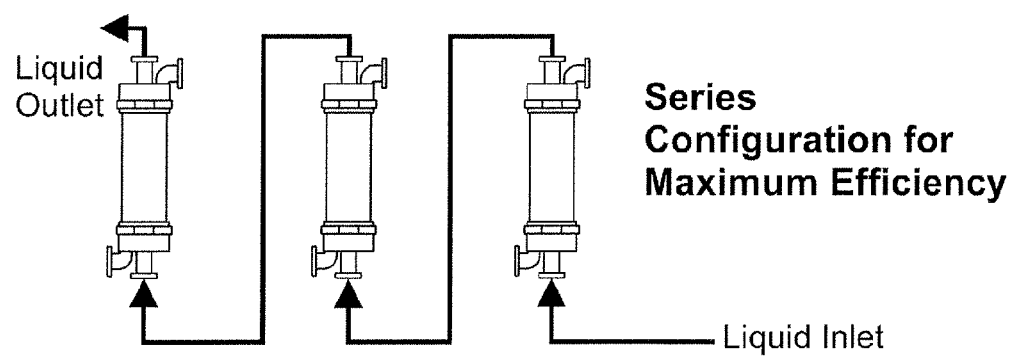

FIGS. 32 and 33 show respective parallel and series contactor configurations.

Figure 34:
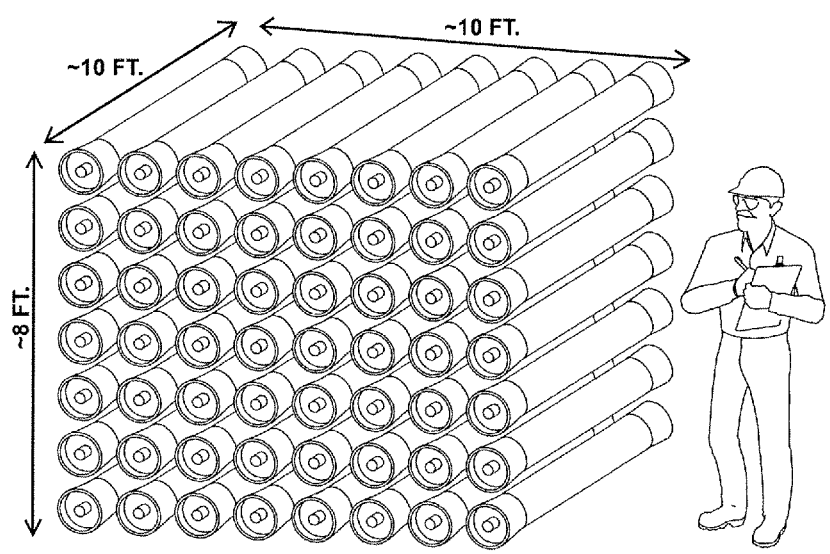
FIG. 34 is a schematic perspective view illustration of one example of a module array of at least one embodiment of the present invention.

FIG. 34 schematically depicts an example multiple module array of the present invention. FIG. 35 provides one example of a module array (like that of FIG. 34) used as a degas skid for use on, for example, an oil rig or drilling platform to degas over 100,000 barrels of seawater per day (depending on the actual configuration or design, selected materials, size and number of modules, and the like, the flow, weight, and other specifications could vary greatly).

Figure 36:
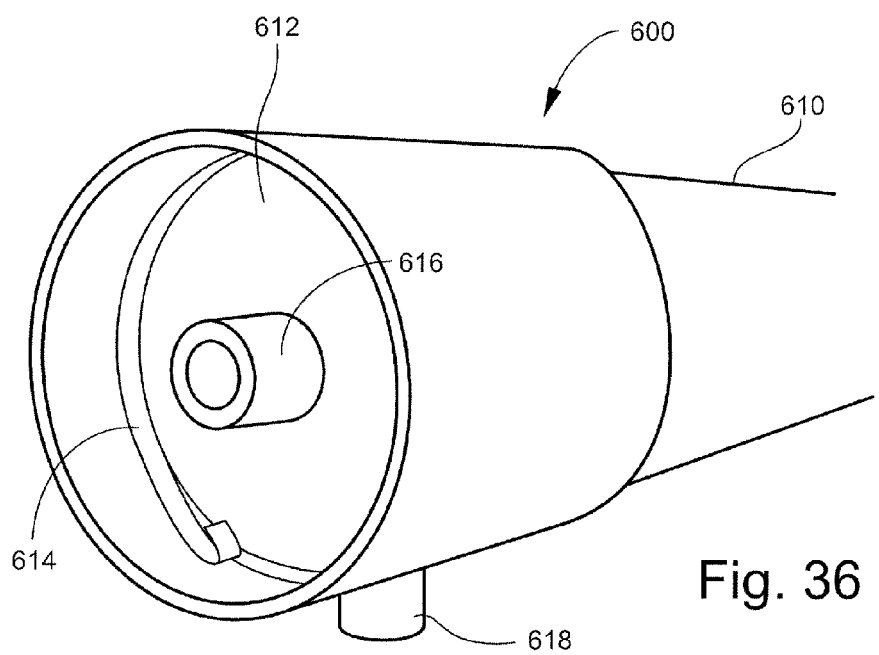
FIGS. 36 and 37 are perspective end views that show respective side gas port and end gas port examples of high pressure contactors in accordance with at least one embodiment of the present invention.

FIG. 36 shows a 4 port module with a preferred side gas port arrangement of at least one embodiment of the instant invention. The module 600 has a housing 610, an end cap 612, an end cap lock 614, an end port 616, and a side port 618.

Figure 37:
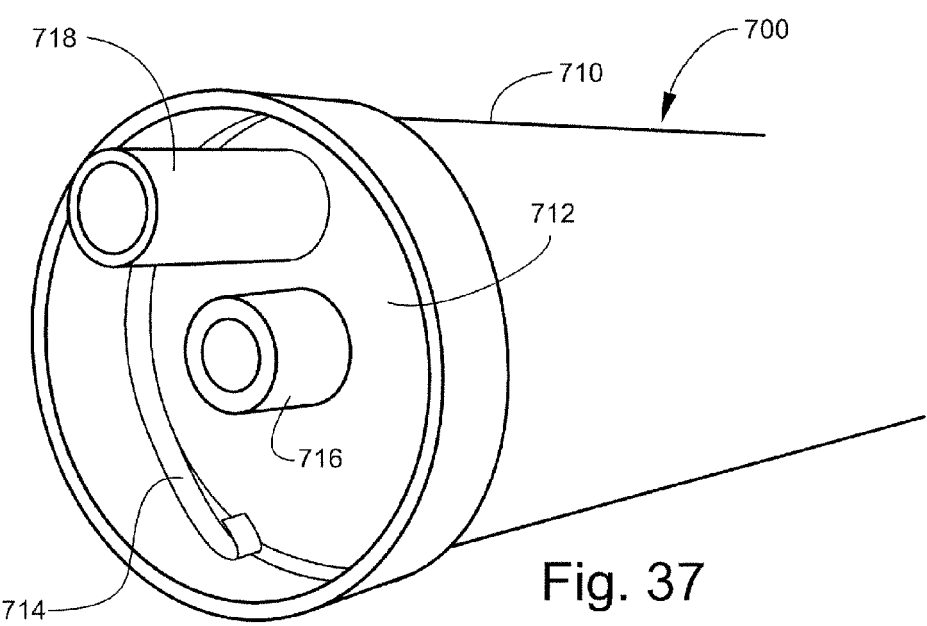

FIG. 37 shows a 4 port module with an alternative gas port arrangement of at least one embodiment of the instant invention. The module 700 has a housing 710, an end cap 712, an end cap lock 714, an end port 716, and an end gas port 718.

Figure 38:
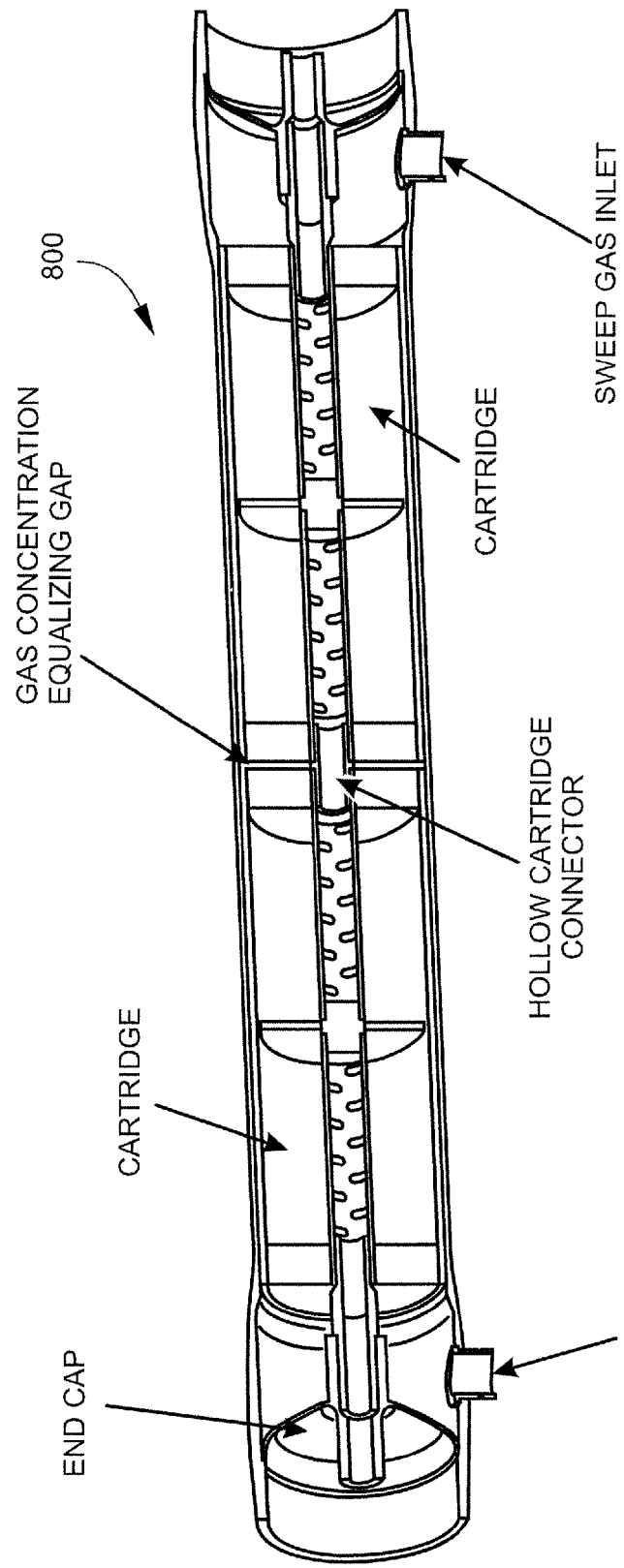

FIG. 38 illustrates an example contactor 800 having two cartridges with a Gas Equalization Gap there between.

Figure 44:
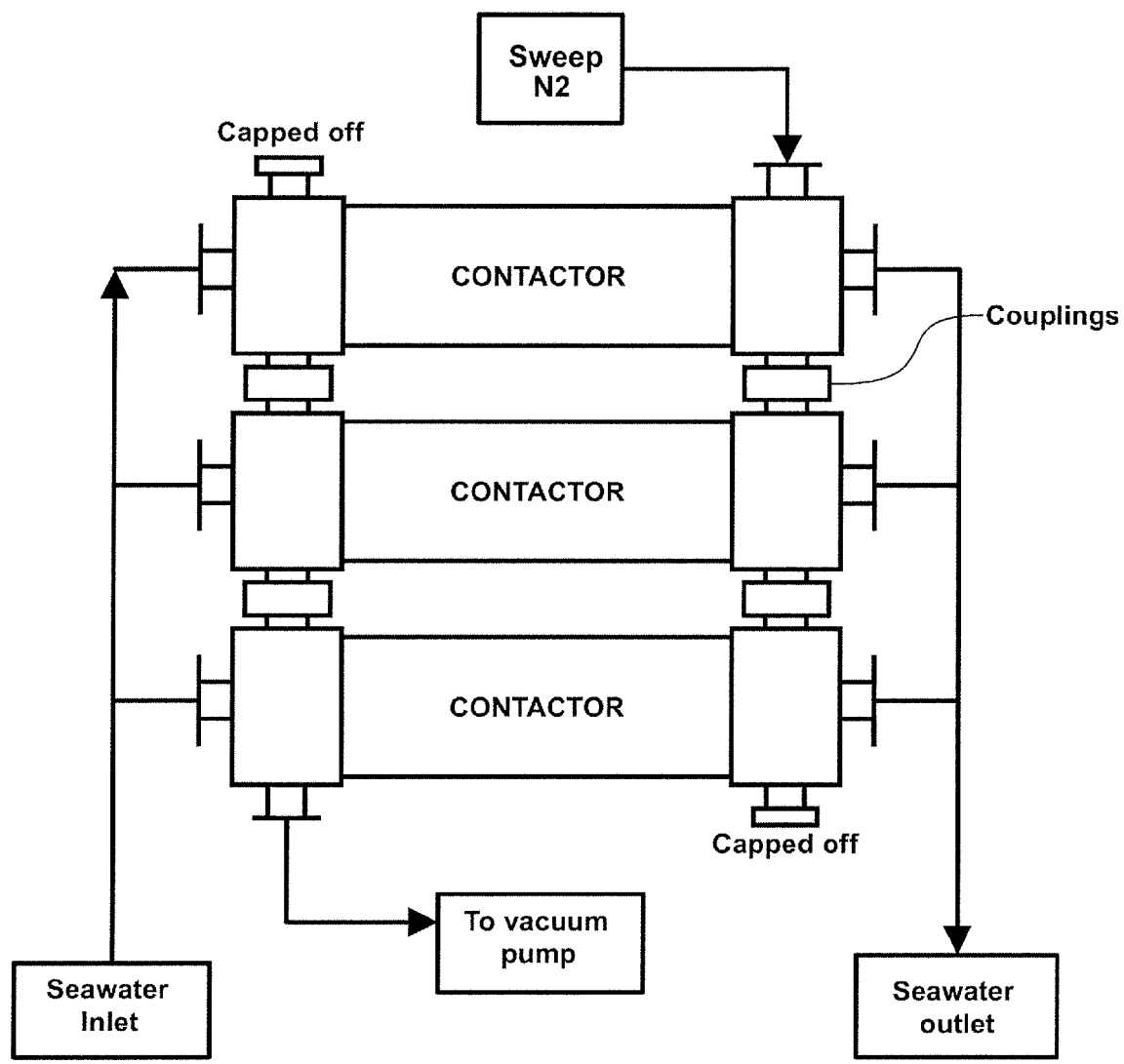

FIG. 39 shows an array 900 of at least three 6 port contactors 400 like those of FIG. 24 with their side ports (gas ports) connected in series by side port couplers 401 adapted to mate with, be received in or be received over the adjacent side ports. The contactors of the array of FIG. 34 may preferably have side ports connected as shown in FIG. 39 or 44 to conserve space, reduce mass, and/or the like.

Figure 40:
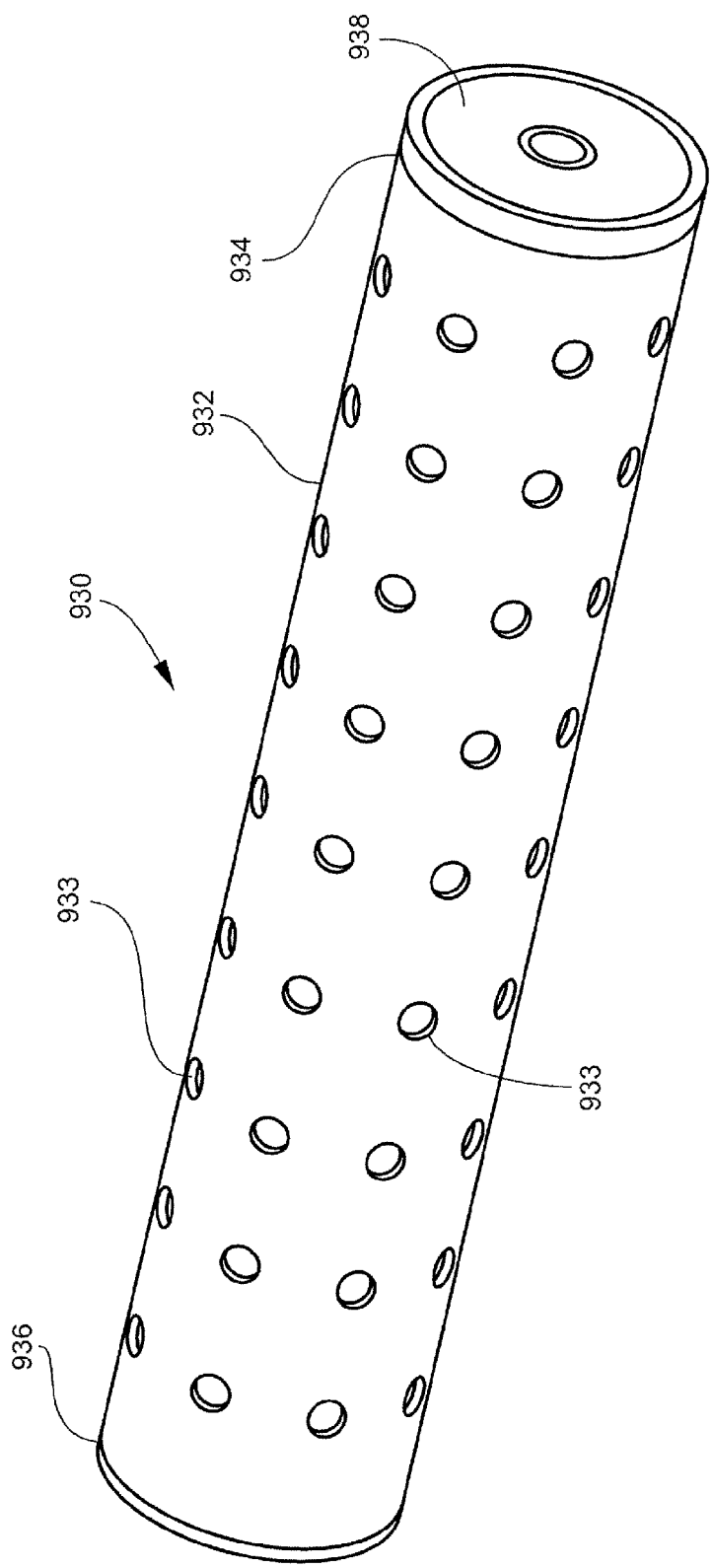
FIG. 40 is a schematic perspective view of a cartridge example with perforations in the outer casing of at least one embodiment of the present invention.

With reference to FIG. 40, a cartridge 930 includes a perforated cylindrical shell, casing or housing 932 with perforations 933, and exterior O-ring grooves 934, 936. Cartridge 930 also includes potting 938, a center tube, and the like (see FIG. 5). As the cartridge 930 is adapted to be used inside a high pressure housing or vessel, the perforations 933 allow the high pressure liquid to flow out through the openings and between the casing and the interior of the vessel thereby taking at least some of the pressure off the casing 932. Such perforations 933 may provide for a reduction in the thickness of the casing 932, the mass of the cartridge 930, and the like.

Further, perforations through the casing or shell allow liquid pressure to be equal inside and outside the cartridge. As a result, the shell wall does not need to have significant hoop strength. Therefore, it is possible to use a less expensive and thinner shell or tube material, and still retain the basic shell-inside-housing design of the present invention. This structure may provide performing degas systems with less weight and at less cost over conventional systems.

Figure 41:
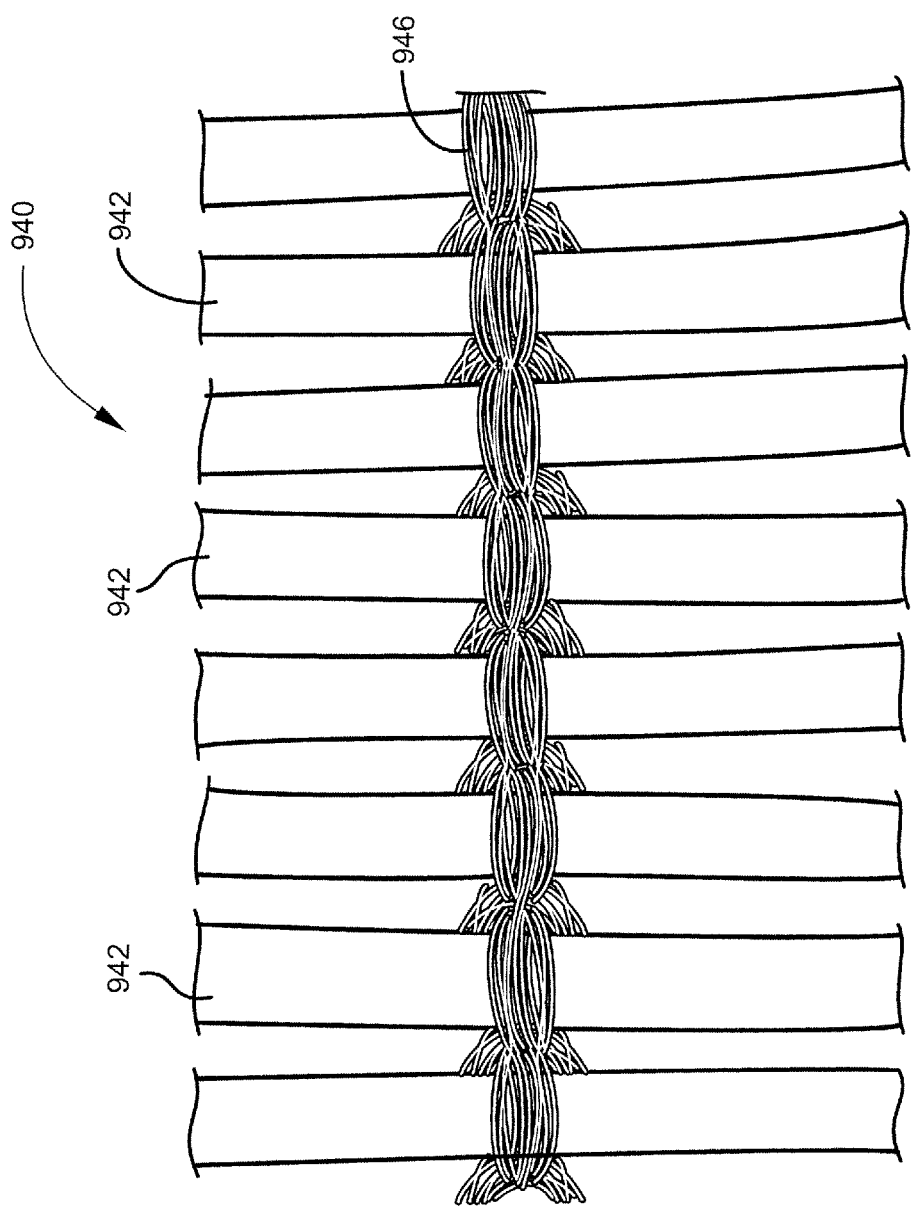
FIG. 41 is a schematic highly magnified surface view of an example of a hollow fiber membrane array.

As schematically shown in FIG. 41, the preferred hollow fiber membrane array 940 includes a plurality of hollow fibers 942, for example, Celgard® X-40 hollow fibers, connected by cross threads 946 spaced along their length. Example hollow fibers may have an outer diameter of about 300 μm.

Figure 42:
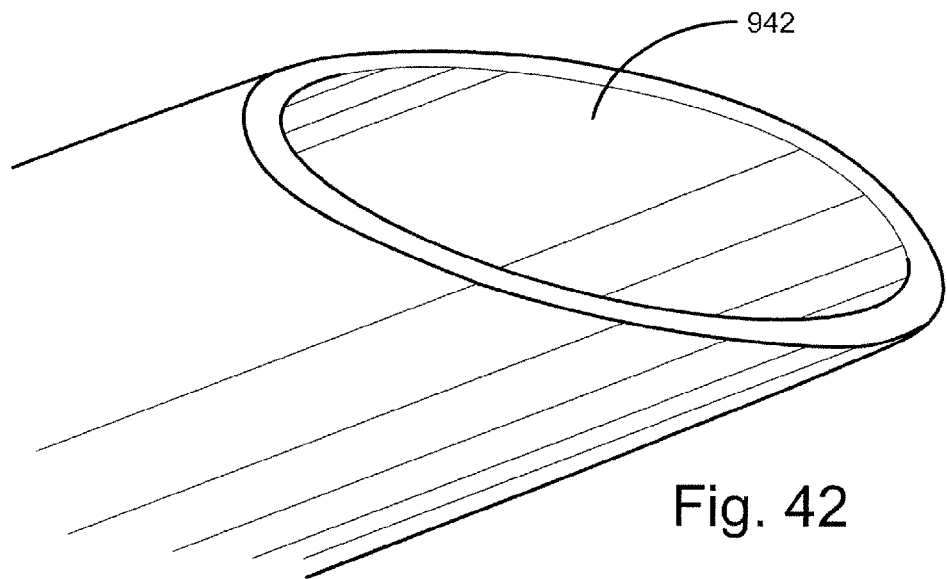
FIG. 42 is a schematic perspective end view of a hollow fiber membrane like one from FIG. 41.

In FIG. 42, one such hollow fiber 942 may have, for example, an outer diameter of about 300 μm and an inner diameter of about 200 to 220 μm.

Figure 43:
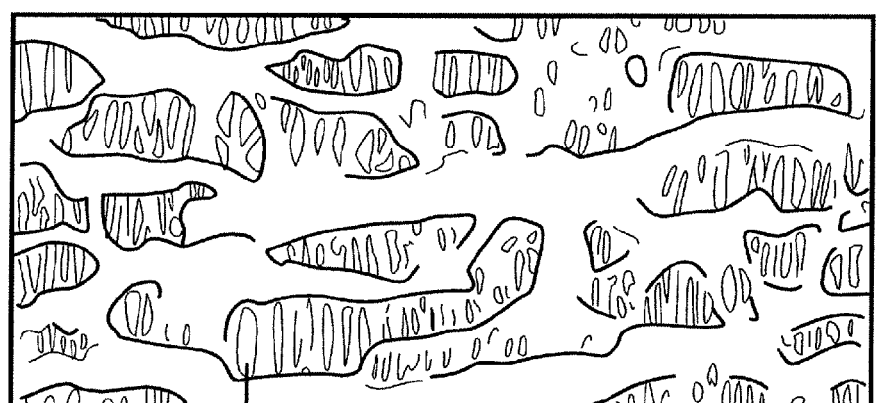
FIG. 43 is a schematic enlarged surface view of a portion of the exterior (shellside) of the hollow fiber of FIG. 42; and, FIG. 44 is a schematic illustration of a particular multiple contactor configuration or contactor array in accordance with at least one embodiment of the present invention.

As shown in FIG. 43, the preferred hollow fiber 942 has slit-like micro pores with, for example, an average pore size of 0.03 μm. Such hollow fibers may be polypropylene and made by an environmentally friendly dry stretch process.

FIG. 44 illustrates a preferred particular multiple contactor configuration or array in accordance with at least one embodiment of the present invention. This particular configuration is especially well suited for degassing seawater using 6 port modules or contactors and $N_2$ sweep gas and vacuum combination (Combo Mode). Although only three contactors are shown, it is understood that more or fewer contactors may be used. Also, this particular configuration could be applied to the respective arrays of FIGS. 34 and 39. In accordance with a particular aspect of the present invention, this particular configuration is especially well suited for replacing or augmenting the conventional vacuum tower on an offshore oil rig or drilling platform. For example, using multiple 6 port high pressure degassing modules or contactors (preferably with non-metallic housings) and $N_2$ sweep gas and vacuum in this particular configuration can easily produce 50,000 barrels per day or more of degassed seawater.

In accordance with at least one embodiment, such a self contained liquid membrane contactor cartridge may include a perforated center tube, a first mat comprising a plurality of first hollow fiber membranes each having a first end and a second end both being open, an optional baffle separating the hollow fiber mat into two areas, a cartridge shell or housing, and potting at each end. The first and second membrane ends are open, for example, to allow strip or sweep gas to pass there through. It may be preferred that the baffle is formed of a center tube connector joining first and second sections of the center tube and by epoxy that is applied over the center tube connector in the center of the mat or bundle while winding forming a dam or block through the entire thickness of the hollow fiber mat. It may also be preferred that the potting be made of epoxy and that the ends of the potting be cut off to form the open first and second ends following potting.

In accordance with at least one embodiment, the center tube forms an opening in each end of the cartridge and is perforated along its length to provide for liquid to flow through the cartridge and over the hollow fibers. The opening in each end of the cartridge is adapted to be in fluid communication with the ports in the end caps of the RO housing. For example, a hollow or tubular adapter or pipe may be used to connect the cartridge openings with the ports in the end caps.

In accordance with at least selected embodiments, the high pressure degassing module preferably includes two or more cartridges in a single RO housing.

In accordance with at least one embodiment, the preferred RO housing is an 8"×40" or 8"×80" RO high pressure housing and the cartridges are about 20", 40" or 80" in length.

In accordance with at least one embodiment, an array of two or more 8"×40" or 8"×80" degassing modules is formed of 6 port RO housings with membrane cartridges therein.

Benefits of 8"×80" Module
  RO style vessel
    ASME rated to 300 psi
    Familiar equipment design
    Simple cartridge replacement
      Shorter down time
      More convenient storage/handling of replacement cartridges
      No specialized tools
      Lower replacement costs
  Compact skid design
    Lower total height The RO pressure housing of the module ensures that if the cartridge fails, or if the cartridge housing or shell bows outwardly, that the failure or cartridge is contained in the pressure housing. As such, the cartridge shell can be made of thinner or weaker stock and the cartridge need not be rated to the full pressure of the RO pressure housing or vessel. It may be preferred that the gap between the outer surface of the cartridge shell and the inner surface of the RO pressure housing or vessel be less than 1.0 inch, more preferably less than 0.5 inch, and most preferably less than 0.25 inch. The smaller the gap, the less chance that the cartridge shell will fail (crack, come off of the potting) and that it will just bow outwardly until it contacts the RO housing.

In accordance with at least selected embodiments, the standard RO housing or vessel may be selected from various brands, including, for example:

1. CodeLine (Pentair Water)—Model 80S30
2. Hangzhou MEY Membrane Technology Co., Ltd—8" SS vessel
3. ROPV—R80S Series
4. PROTEC (Bekaert Progressive Composites)—PRO8-300-SP (this vessel may only work with positive sweep pressure, not vacuum).

Although the particular side port or gas port seal design is not limited, the preferred is a seal design that will work with both positive and negative pressures. Some vessel manufacturers make seal designs that work only with positive pressure as the intended use is for positive pressure RO.

Some of the polymer components may be selected from, for example, polyvinyl chloride (PVC), chlorinated polyvinyl chloride (CPVC), high impact polystyrene (HIPS), polyacrylonitrile-butadiene-styrene (ABS), polyacrylate-styrene-acrlonitrile (ASA), and polycarbonate (PC).

One of the limitations in a conventional, shell-side flow contactor is the length of fibers. Having excessively long fibers causes the lumen side of the fibers to become saturated with the gas one is trying to remove before the sweep gas can exit the opposite end of the fiber. This effect is further exaggerated by the fact that the fibers closest to the center tube, where the velocity is highest, are more efficient than the fibers at the outermost diameter. The end result is that the innermost fibers will have little driving force remaining to remove absorbed gas, while the outermost fibers will still have the capacity to remove gas. The problem is the fibers with the highest driving force are located in the least efficient shell-side flow location.

In accordance with at least one aspect of the present invention, a mixing chamber or 'Gas Concentration Equalizing Gap' is added within the length of the lumens in the module. This gap allows for sweep gasses within the lumens closest to the center tube all the way out to the furthermost diameter to remix and equalize within the length of the module. Doing so allows the driving force of the fibers to increase where their efficiency is the highest (at the center tube) and to decrease where their efficiency is the lowest (at the outermost diameter). The end result is a significant increase in overall performance as compared to a module without this feature with equivalent membrane area. The DO removal efficiency of the present 8×40 module with spaced cartridges is significantly better than a conventional contactor (below 100 gpm) even though the membrane areas are roughly equivalent.

In accordance with possible other preferred aspects of the present invention, a hollow-fiber, microporous, hydrophobic, membrane cartridge is inserted into a pressure vessel, the cartridge is self contained and may or may not be capable of withstanding the internal pressure without the aid of an additional support structure, an RO pressure vessel may be the preferred vessel, unlike reverse osmosis a gas and/or vacuum are used on the side ports as opposed to a liquid, once installed, the cartridge wall may be allowed to deflect to the point that it contacts the inside diameter of the pressure vessel, a cartridge clearance with the housing sufficiently loose as to allow for easy installation may be provided, while clearance may be sufficiently tight as to provide a support structure upon the cartridge housing deflecting due to internal pressure, and/or the like.

According to at least one embodiment, the hollow fibre mats are embedded/potted in a resin by the following method: A staple of hollow fibre mats is introduced into a housing. In a first step, a fugitive or removable liquid or gel is introduced into the housing via the openings while the housing is spinning around its central axis. As a result, the fugitive or removable liquid or gel forms a layer into which the ends of the hollow fibres are embedded. In a second step a liquid hardenable resin is introduced into the housing and by the centrifugal effect forms a resin layer over the first layer of the fugitive or removable liquid or gel, such that the hollow fibres are embedded in the resin layer in in a segment along the fibre length nearby the fibre ends. After hardening of the resin, the fugitive or removable liquid or gel is removed and the hollow fibers are embedded in the hardened resin such that the fibers extend with their ends beyond the resin layer, then the fiber ends are trimmed.

In accordance with at least selected embodiments of the present invention, an improved liquid degassing membrane contactor or module includes a high pressure housing and at least one degassing cartridge therein. It may be preferred that the high pressure housing is a standard, ASME certified, reverse osmosis (RO) or water purification pressure housing or vessel (made of, for example, polypropylene, polycarbonate, stainless steel, corrosion resistant filament wound fiberglass reinforced epoxy tubing, with pressure ratings of, for example, 150, 250, 300, 400, or 600 psi, and with, for example 4 or 6 ports, and an end cap at each end) and that the degassing cartridge is a self-contained, hollow-fiber membrane cartridge adapted to fit in the RO high pressure housing.

Potting or thermosetting materials include, but are not limited to, epoxy, and polyurethane. Epoxies are preferred. Thermoplastics, as used herein, refers to a high polymer that softens when exposed to heat and returns to its original condition when cooled to room temperature; the term is usually applied to synthetics such as polyvinyl chloride, nylons, fluorocarbon polymers, linear polyethylene, polyurethane prepolymer, polystyrene, polypropylene, and cellulosic and acrylic resins. Exemplary thermoplastics include polyolefins, such as polypropylene and polyethylene.

Different potting methods may be employed to complete the second potting step. Different potting methods, as described hereinabove, include, but are not limited to, mold potting, centrifugal potting, and gravity potting.

The present invention may be embodied in other forms without departing from the spirit and the essential attributes thereof, and, accordingly, reference should be made to the appended claims, rather than to the foregoing specification, as indicated in the scope of the invention.

We claim:

1. A high pressure degassing module comprising:
    a high pressure housing being a standard RO pressure vessel having a pressure rating of at least 100 psi; and
    at least one self-contained cartridge;
    wherein the module housing will contain and restrain the cartridge shell should the cartridge shell swell or fail under pressure.

2. The high pressure degassing module of claim 1 including a plurality of said self-contained cartridges.

3. A high pressure spiral-type hollow fiber membrane fabric-containing module or contactor, comprising:
    A high pressure module housing;
    A pair of end caps adapted to fit in or on the ends of said module housing;
    Liquid end ports in each of said end caps;
    At least one gas port in at least one of said end caps or in the side of said module housing near one end thereof;
    At least one membrane cartridge adapted to fit in said module housing, each membrane cartridge comprising:
    a. a plurality of hollow fiber membranes each having a lumen, said membranes being formed into a fabric-like array in which the hollow fibers substantially are mutually-parallel and constitute the fabric weft, and are held in spaced-apart relationship by filaments constituting the fabric warp;

b. the array being wound upon an axis which is substantially parallel to the hollow fibers into a spirally-wound membrane bundle having two bundle ends and a cylindrical exterior surface;

c. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers constituting a first one of the bundle ends being exposed and communicating with the exterior of the bundle;

d. a cartridge shell, casing or housing having first and second housing ends and a cylindrical housing interior and being suitably shaped to contain the membrane bundle, the tube sheet (potting) adjacent the first cartridge housing end sealing the first bundle end to the cylindrical housing interior, said cartridge housing which contains the bundle defining two regions mutually communicating through the membrane including (i) a shell-side space exterior to the portion of the bundle between the tube sheets and within the housing, and (ii) a lumen-side space including the hollow fiber lumens and the first bundle end;

Wherein an interior face of a first of said end caps and an interior of said module housing adjacent the first cartridge housing end, together with the cylindrical housing interior and the first bundle end, seal a first module housing end and define a first chamber communicating with the membrane lumens;

Wherein an interior face of a second of said end caps and an interior of said module housing adjacent a second cartridge housing end, together with the cylindrical housing interior and a second bundle end, seal a second module housing end and define a second chamber communicating with the membrane lumens;

said liquid ends ports being operatively connected to the shell-Side space of each said membrane cartridge, and arranged to permit fluid injection and withdrawal there through; and the at least one gas port communicating with at least one of the first and second chambers, and arranged to permit gas injection and withdrawal there through;

wherein the module housing will contain and restrain the cartridge shell should the cartridge shell swell or fail under pressure.

4. The high pressure spiral-type hollow fiber membrane fabric-containing module or contactor of claim 3, further comprising:

At least two gas ports with one gas port in each of at least each of said end caps or in each side of said module housing near each end thereof.

5. The high pressure spiral-type hollow fiber membrane fabric-containing module or contactor of claim 3, further comprising:

At least two membrane cartridges adapted to fit in said module housing.

6. The high pressure spiral-type hollow fiber membrane fabric-containing module or contactor of claim 3, further comprising:

a hollow mandrel in each of said membrane cartridges having a longitudinal axis and a cylindrical exterior surface, an axial bore, and perforations along the surface which communicate with the bore.

7. The high pressure spiral-type hollow fiber membrane fabric-containing module or contactor of claim 3, further comprising:

both of the lumen ends of the hollow fibers are exposed and communicate with the exterior of the bundle.

8. The high pressure spiral-type hollow fiber membrane fabric-containing module or contactor of claim 3, further comprising:

wherein said module housing is a high pressure vessel or housing being a RO high pressure vessel.

9. The high pressure spiral-type hollow fiber membrane fabric-containing module or contactor of claim 3, further comprising:

wherein the cartridge housing need not support the high pressure as the module housing will prevent the cartridge housing from bursting and if the cartridge housing swells under pressure, the module housing will contain and restrain the cartridge housing.

10. The high pressure spiral-type hollow fiber membrane fabric-containing module or contactor of claim 3, further comprising:

wherein the module housing and end caps will contain and restrain the membrane cartridge should it fail.

11. The high pressure degassing module of claim 1 wherein said high pressure housing being selected from the group consisting of: a fiberglass housing; and a stainless steel housing.

12. The high pressure spiral-type hollow fiber membrane fabric-containing module or contactor of claim 3 wherein said high pressure module housing being selected from the group consisting of: a fiberglass housing; and a stainless steel housing.

13. A high pressure degassing module comprising:
a high pressure housing being a standard RO pressure vessel; and
at least one self-contained cartridge;
wherein the module housing will contain and restrain the cartridge shell should the cartridge shell swell or fail under high pressure.

14. The high pressure degassing module of claim 13 wherein said self-contained cartridge having a perforated shell with at least one perforation through it.

15. The high pressure degassing module of claim 14 wherein the combination of said perforated shell and said high pressure housing prevent failure of the cartridge as the housing limits the shell expansion should said perforated shell swell under pressure.

16. The high pressure degassing module of claim 13 wherein said self-contained cartridge having a thin shell.

17. The high pressure degassing module of claim 13 wherein the combination of said thin shell and said high pressure housing prevent failure of the cartridge as the housing limits the shell expansion should said thin shell swell under pressure.

* * * * *